United States Patent [19]

Ogden

[11] 4,195,773

[45] Apr. 1, 1980

[54] PROGRAMMABLE CONTROLLER SYSTEM FOR INDUSTRIAL PROCESS APPARATUS

[76] Inventor: Ralph Ogden, 1304 Fisher St., Munster, Ind. 46321

[21] Appl. No.: 963,415

[22] Filed: Nov. 24, 1978

Related U.S. Application Data

[63] Continuation-in-part of Ser. No. 779,579, Mar. 21, 1977, abandoned, and Ser. No. 932,475, Aug. 10, 1978, said Ser. No. 932,475, is a continuation-in-part of said Ser. No. 779,579

[51] Int. Cl.² .................. G06K 21/06; G06C 15/00; H02B 1/04
[52] U.S. Cl. .................. 235/495; 235/487; 235/494; 361/352
[58] Field of Search .................. 360/4, 15; 235/487, 235/489, 492–495, 61.11 R, 61.11 B, 61.11 C, 61.11 D, 61.11 E, 61.12 R, 61.12 C, 61.12 N, 61.12 M, 61.6 R, 61.6 H, 419; 35/48 B; 234/115; 317/112, 113, 117, 139; 340/149 A; 307/149

[56] References Cited

U.S. PATENT DOCUMENTS

| | | |
|---|---|---|
| 2,171,556 | 9/1939 | Higginbottom ............ 235/492 |
| 2,835,206 | 5/1958 | Gordon ..................... 104/88 |
| 2,930,941 | 3/1960 | Neidenberg ................ 317/139 |
| 2,941,054 | 6/1960 | Willis ...................... 200/46 |
| 3,002,115 | 9/1961 | Johnson .................... 307/149 |
| 3,035,764 | 5/1962 | Beman ...................... 235/61.9 A |
| 3,228,001 | 1/1966 | Herzl ....................... 340/149 |
| 3,321,744 | 5/1967 | Jensen ...................... 340/163 |
| 3,424,879 | 1/1969 | Shlesinger .................. 200/61.14 |
| 3,576,430 | 4/1971 | Fickenscher ................ 235/437 |
| 3,597,593 | 8/1971 | Stanesby ................... 235/61.6 H |
| 3,643,348 | 2/1972 | Azure ....................... 235/61.6 E |
| 3,769,552 | 10/1973 | Cook ....................... 317/112 |
| 3,918,633 | 11/1975 | Maurer .................... 235/61.11 B |
| 3,961,164 | 6/1976 | Reed ....................... 235/61.12 N |
| 3,982,102 | 9/1976 | Cidade ..................... 235/61.6 E |

OTHER PUBLICATIONS

Donald Henry–"*Sequential Approach Simplifies PLC Programming*"; Control Engineering, Mar. 1976, pp. 83–84.

*Primary Examiner*—Robert M. Kilgore
*Attorney, Agent, or Firm*—McWilliams, Mann & Zummer

[57] ABSTRACT

A programmable controller system for controlling industrial processes in which the system includes a central processing unit including a random or other access memory, a programming tape, a tape reader for sensing computer data bits on the programming tape and connected to the processing unit for storing the data bits in memory, and means for connecting I/O devices to the processing unit, wherein a work sheet is employed that is arranged for manual marking of the program process steps in terms of I/O functions thereon in sequentially consecutive binary notation fashion computer data word form, in the order of sequence of the process steps. The tape is a ribbon that is delineated to have applied to same the work sheet computer data word indicia in modularized group or set form, in which groups or sets the computer data words for the consecutive process steps are sequentially arranged transversely of the tape, with succeeding groups or sets following in sequential order, with the work sheet computer data word indicia being manually marked on the tape binary notation system fashion, and the reader being arranged for pull through application of the tape therethrough and for sensing the tape markings in consecutive word group or set form, with continuous manually induced movement of the tape through the reader, for storing of the computer word sets in the controller memory for controlling the process through the controller central processing unit.

10 Claims, 23 Drawing Figures

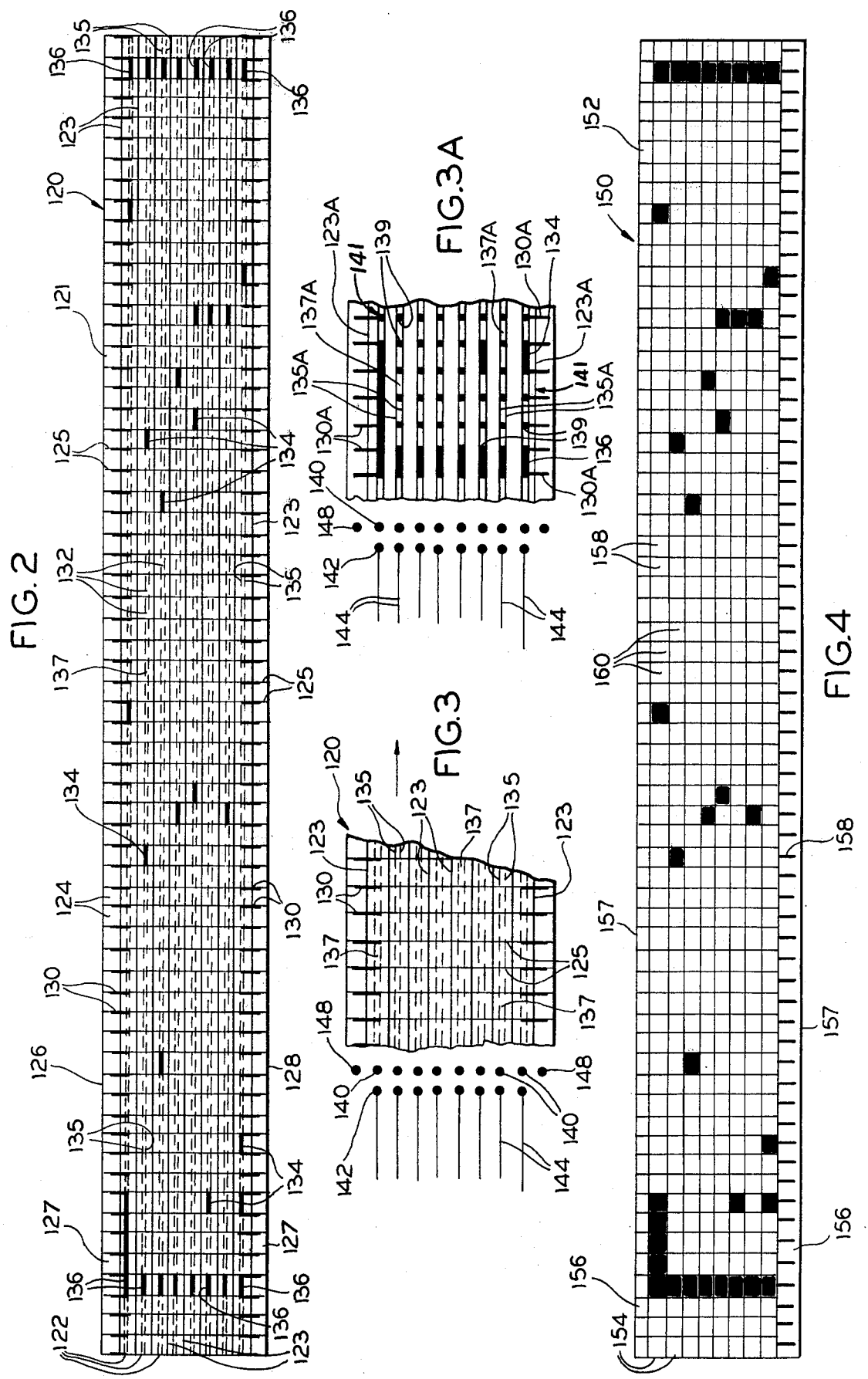

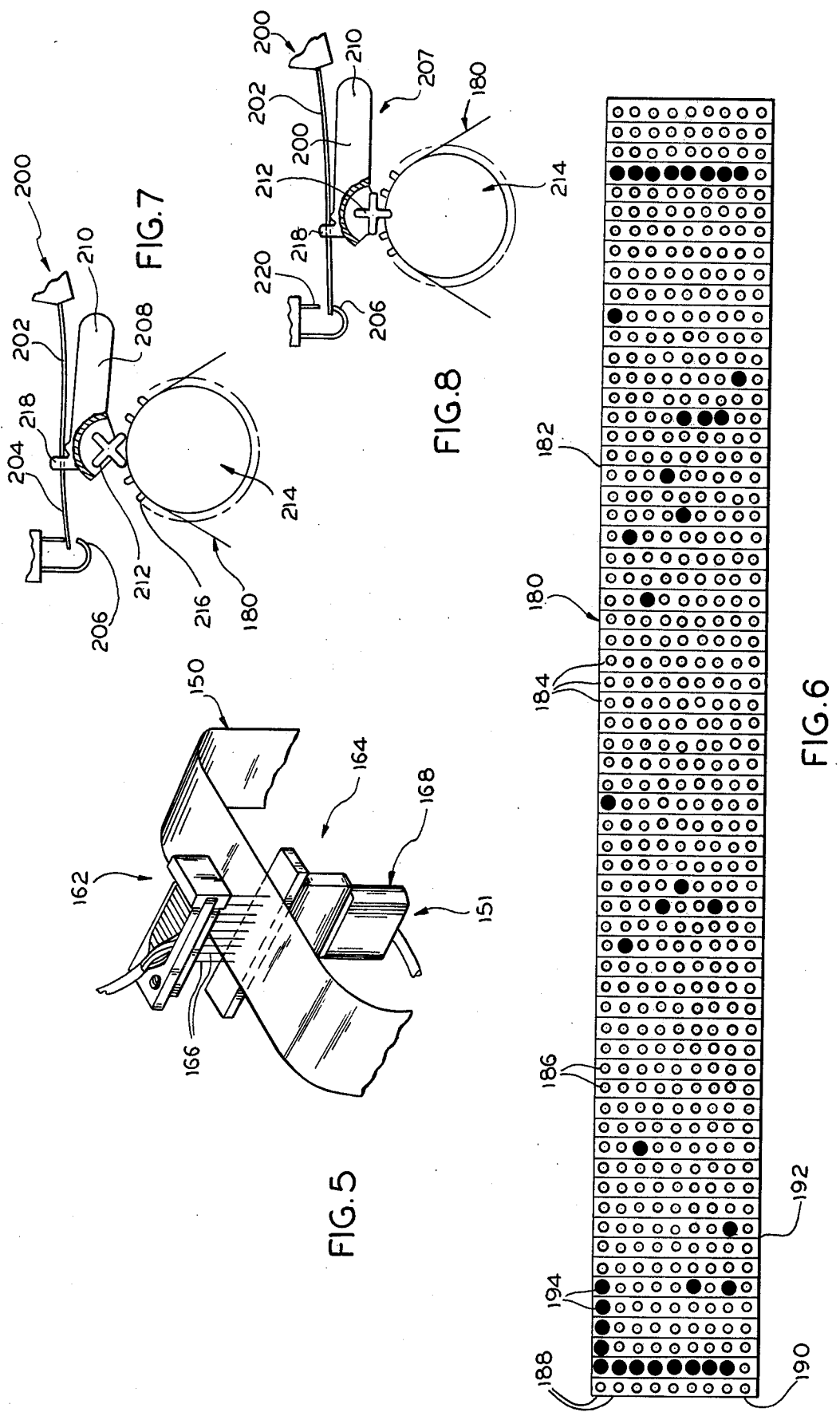

FIG. 11

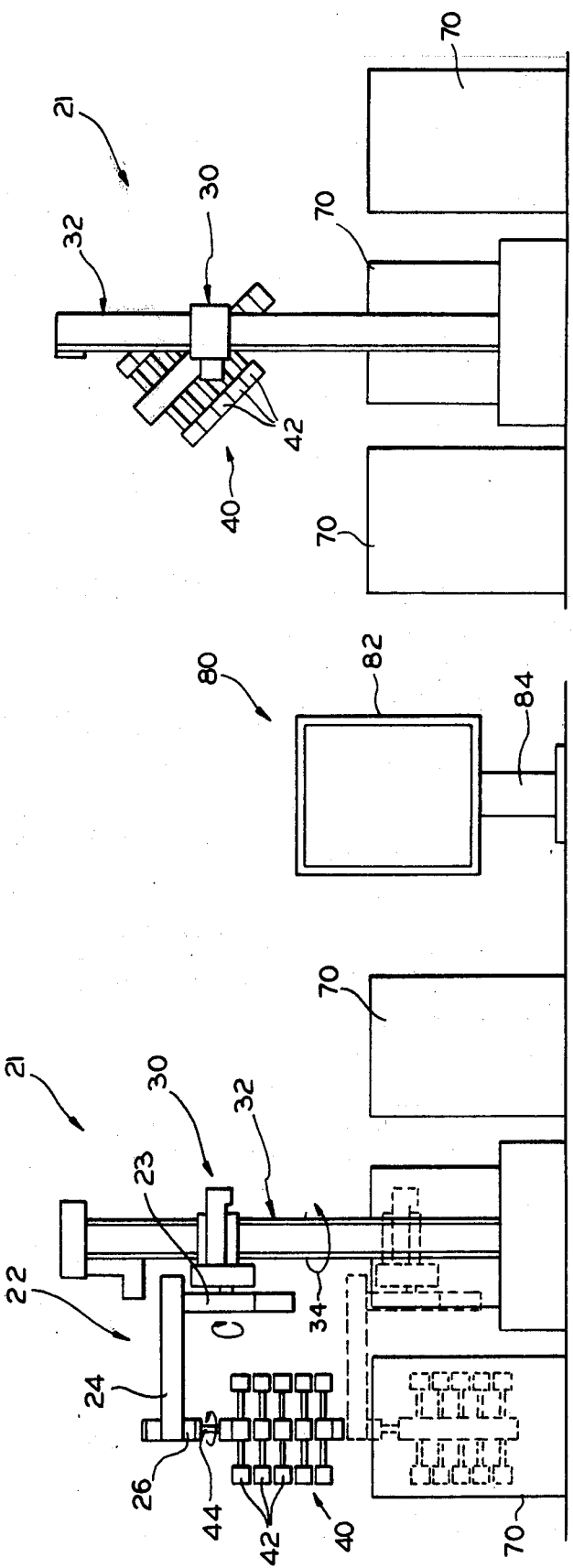

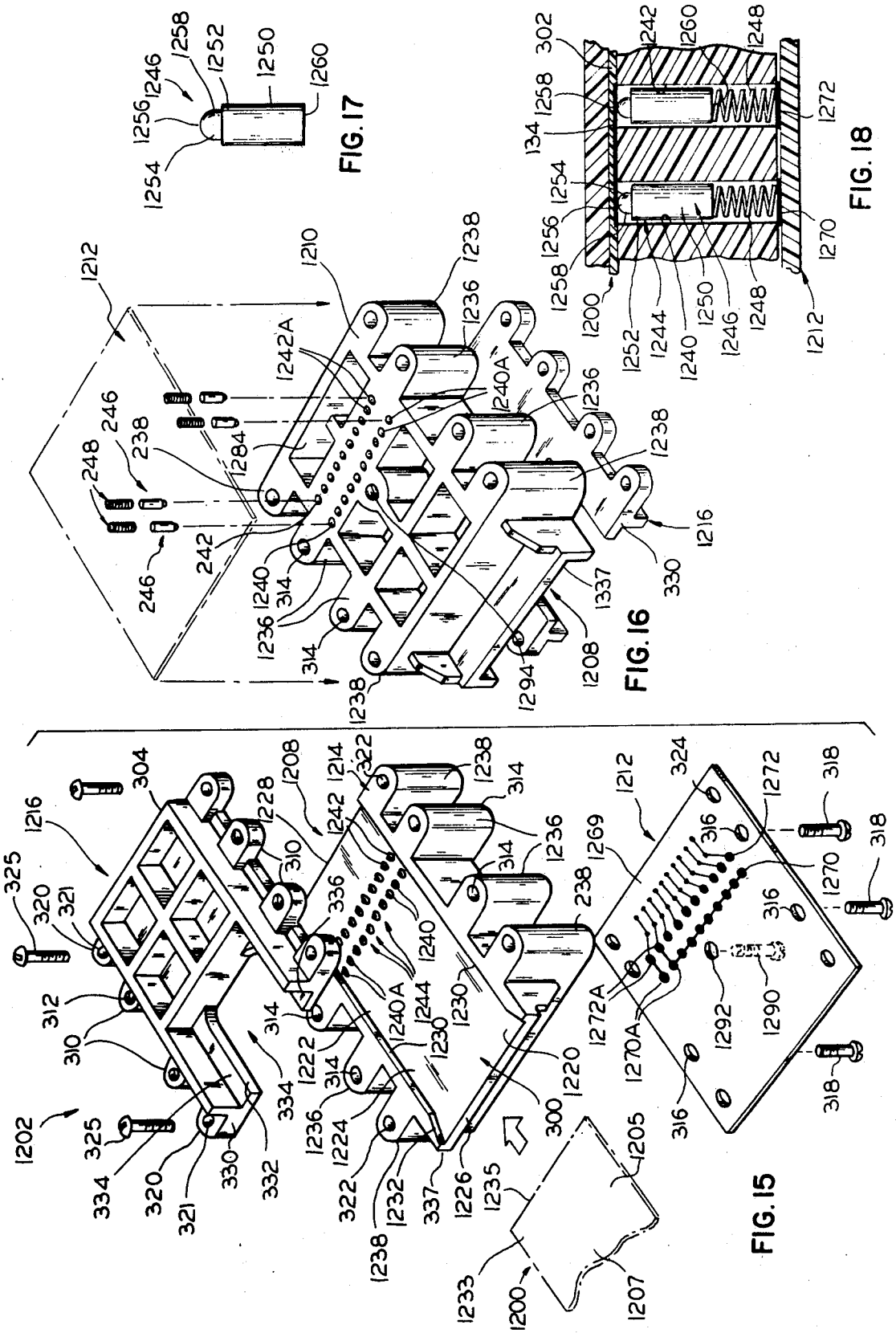

PROGRAMMABLE CONTROLLER SYSTEM FOR INDUSTRIAL PROCESS APPARATUS

This application is a continuation-in-part of my applications Ser. Nos. 779,579, filed Mar. 21, 1977 (now abandoned) and 932,475, filed Aug. 10, 1978, the latter being a continuation-in-part of my said application Ser. No. 779,579 (the entire disclosures of which are hereby incorporated herein by this reference).

This invention relates to programmable controllers, and more particularly, to apparatus for controlling the operation of industrial processing equipment.

Control systems with electro-mechanical relays for many years were the mainstay of automated industrial systems. Despite such problems as contact wear, coil burnout, mechanical failures, trouble shooting difficulties, and relatively large space requirements, relay systems became widely accepted and understood in the world of machine control.

Programmable controllers have come into common use in recent years to avoid the need of using traditional electro-mechanical relay logic circuitry of the older forms of industrial process control systems.

A typical programmable controller consists of one or more input modules, one or more output modules, one or more memory modules, and a processor, usually referred to as the central processing unit. The input module converts the status condition of the process variables into electrical signals that can be understood by the programmable controller. The output module converts the commands issued by the central processing unit into signals that can actuate or deactuate corresponding machine devices; it usually consists of solid state switches operated through the output interface to control power to the desired external devices.

The memory module contains the instructions that represent the systems control circuitry and the action that is to be taken in response to each condition of the input devices. Various memory types, as well as methods to prepare and insert the instructions that are employed by the programmable controller manufacturers, are available.

The central processing unit supervises the other sections of the system. Typically, the processor performs logical comparisons on the inputs and outputs in response to instructions in its memory, and it energizes or deenergizes outputs as a result of these comparisons.

More recently, LSI (large scale integration) devices have been devised in extremely small size to perform the functions of the central processing unit; these have become generally known as microprocessors. Typically, the microprocessor is contained on a single IC (integrated circuit) chip, though in some cases the microprocessor is made up of two, three or even more, such chips.

Prior to the invention disclosed in my above identified applications, the programming of microprocessors was commonly done by way of the familiar ladder diagram, which is entered into the controller through a variety of formats. A common data entry format is the CRT (cathode ray tube display) used as an accessory to the keyboard terminal, which provides a full alphanumeric and special function keyboard. The CRT allows one to see the ladder diagram as interpreted by the controller, and the alphanumeric keyboard provides for a large range of special notations, comments, and notes.

In addition to the ladder diagram form of entry, the programmer can also program with Boolean algebraic equations and assembly language. The Boolean form is the mathematical expression of the ladder diagram, and assembly language is simply the language the microprocessor uses to communicate.

A major disadvantage inherent in conventional programmable controllers has been the need to have available the services of a highly trained programmer familiar with ladder diagram technology. Further, since conventional systems without battery back up may lose their data base should there be an electrical shut down, and restoration of the data base frequently involves time consuming procedures requiring the services of the highly specialized programmer before production can be resumed.

A principal object of this invention is to provide a programmable controller system, apparatus and method that eliminates the need for highly skilled programming personnel to operate programmable controllers, and permit the programming to be efficiently done by personnel who operate the industrial processing equipment involved, but have no special programming experience or training.

Another principal object of the invention is to provide a programmable controller arrangement and method utilizing the binary numbering system wherein the I/O programming is made up in computer word form for each processing step, and the resulting computer words are stored and retrieved in sequential form in a manner that permits ready revision of the program without costly shutdowns, and by the personnel operating the processing equipment, without the need to call in highly skilled programmers.

Yet another principal object of the invention is to eliminate the need for the practice of the ladder diagram technology in preparing programming materials and substitute for that the preparation of a simple work sheet that organizes the I/O data in computer word, binary numbering system oriented form, and the storing of such computer words utilizing manual marking techniques for incorporating the computer word data on a tape that provides both a vehicle for inserting the data involved in the controller memory through the use of tape reader technology, as well as a preservable but changeable record of the program so stored.

Another important object of the invention is to provide reliable programmable controller programming equipment of greatly reduced cost and ease of use, and which requires no special training or experience to use with facility.

Still other objects of the invention are to provide programmable controller equipment that is economical of manufacture, convenient to install and use, and is long lived and efficient in operation.

In accordance with the invention, a programmable controller system, apparatus, and method, for controlling industrial processes, are provided including a central processing unit provided with a random or other access memory including an instruction register, a tape reader for sensing computer data bits on a tape specifically arranged to practice the invention, which tape reader is connected to the processing unit for storing the data bits in the memory register, and means for connecting I/O devices to the processing unit.

The invention contemplates as a basic programming tool a programming work sheet that is delineated to define a series of vertical columns to which the inputs and outputs of the processing being programmed are respectively assigned, and a series of superposed horizontal channels which have consecutively assigned to same, the sequential steps of the process being programmed. The work sheet columns and channels intersect to form individual work sheet data bit receiving blank areas to which manual entry marking marks, such as an "x", or a check mark, are applied for indicating I/O functions that are to be activated or changed for each step of the process, in accordance with the desired predetermined program of operation of the equipment that has been or is being set up to perform the process.

The work sheet channels for each step, in accordance with the invention, comprises a computer word receiving space, the ends of which are delineated or marked off by appropriate indicia at either end of the respective channels, whereby, utilizing the binary notation numbering system in practicing the invention, the work sheet horizontally extending channels for each process step provide a computer word for insertion in the processing unit memory.

Further in accordance with said invention, the computer words provided by the work sheet are sequentially entered into memory, in sequence in accordance with the order of the process steps involved, and in consecutive or serially oriented groups to form the data base. This is effected, in accordance with the invention, by the provision of a tape that is delineated lengthwise of same to define a plurality of channels that are proportioned to be widthwise congruent or alignable with a predetermined number of the work sheet computer word channels. In a preferred embodiment of the invention, the tape is proportioned widthwise of same to have its channels widthwise congruent with eight of the work sheet computer word channels.

The tape is arranged for permitting manual application to same of the computer word data entered on the corresponding work sheet channels in the practice of the invention; this is done by laying one end of the tape over the face of the work sheet, and over the top group of work sheet channels, and in centered or congruent relation thereto, with the overlying tape channels being manually marked in correspondence with the manual markings of the work sheet for the work sheet channels involved (the top eight work sheet channels in the indicated preferred embodiment). The tape is also marked in each of its channels to indicate the location of the work sheet word end indicia so that the word length for the first group of computer words being applied to the tape is delineated at either end thereof in each channel of the tape that is to correspond to a work sheet computer word channel.

The programming data for the next group of the same number of work sheet computer word channels is applied to the channels in like manner, with the tape being appropriately moved lengthwise of same to overlie the second group of work sheet channels with a fresh length of tape commencing from the ends of the first set of computer words as applied to the tape. Again, the manually marked data work sheet in the second group of work sheet channels is manually applied to the fresh tape section, as well as the indicia indicating the ends of the word length involved.

The programming data of the work sheet for the remaining steps of the process is applied to the tape in like manner.

Further in accordance with the invention, the programming data that has been applied to the tape is entered into memory using a tape reader arranged to sense the data bits represented by the indicated data application to the tape, and with continuous and uninterrupted movement of successive lengths of the tape through the reader. The tape reader is arranged binary system fashion to indicate for each I/O location of a computer word representing a process setp a zero if there has been no manual marking in the work sheet spaced provided for same, and a "1" if there has been a manual marking in such space.

The invention contemplates that tape reading arrangements of the electrical, photo, magnetic or punched tape type may be employed as desired for particular applications. The invention further contemplates that the tape reader be arranged so that the tape may be manually pulled through same to effect the reading functions of the reader and insert into memory the consecutive groups of computer words representing the sequential steps of the process, as successive lengths of the tape are manually pulled through the reader. The reader thus is of the continuous motion reading type.

Assuming that the microprocessor employed as the invention contemplates, is, for instance, either a Fairchild F-8 unit, or an Intel 8080 unit (both are eight bit central processing units), with such units having random access memory (RAM), after the program is in memory (to form the processor data base), it is appropriate to manually step through the program with the processing machine power off to check out the accuracy of the program. Assuming that the processing equipment is otherwise ready for operation, the programmor may then be put on automatic operation to effect sequential performance of the industrial process involved in accordance with the predetermined order provided by the program in question.

At the outset it will be seen that programming utilizing the invention of said application can be effected by personnel who, though they should be familiar with the operation of the processing machines involved and have the technical qualification this requires, they need not have any significant programming training or experience, and especially, they need not have familiarity with ladder diagram technology. Layout of the program on the work sheet is simple and uncomplicated, and provides a visual overview of what is to happen as each step of the process is performed. The resulting computer work data for each process step is readily transferred to tape using convenient manual marking methods, with the tape and reader being arranged for simply draw through application of the tape to the reader. The tape serves as a permanent record of what is in memory, through both the work sheet and the tape may be varied as desired to change the program, with the new revised program being inserted into memory as a revised data base by again merely pulling the tape through the tape reader to automatically cancel out the first program from memory and insert the new or revised program in its place.

Other objects, uses, and advantages will be obvious or become apparent from a consideration of the following detailed description and the application drawings in which like reference numerals indicate like parts throughout the several views.

In the drawings:

FIG. 1 illustrates the layout of a typical work sheet that may be devised in accordance with the practice of the invention, that illustrated laying out a program for a process of making molds for investment castings;

FIG. 2 diagrammatically illustrates one form of manually markable tape that may be employed in connection with the invention, with the tape illustrated being adapted for manual marking with electrically conductive inking or pencil for electrical sensing of the programming data involved;

FIG. 3 is a diagram similar to that of FIG. 2, but illustrating the tape of FIG. 2 as operatively associated with the diagrammatically illustrated contacts of a tape reader arranged for practicing the embodiment of FIGS. 2 and 3;

FIG. 3A is similar to FIG. 3 but illustrating a modification of this tape;

FIG. 4 is similar to that of FIG. 2, but illustrates a manually markable tape suitable for use in connection with photo reading equipment;

FIG. 5 is a diagram illustrating the tape of FIG. 4 applied to a photo reading type tape reader;

FIG. 6 is a diagram similar to that of FIG. 2 showing a punched tape and means for manually marking same in accordance with the invention;

FIGS. 7 and 8 are diagrams illustrating an electro-mechanical reader for sensing the data applied to the tape of FIG. 6 by the indicated manually marking of same;

FIG. 11 is a diagram illustrating the layout of a typical memory bit register in the practice of the invention;

FIGS. 12 and 13 are diagrammatic side elevational views illustrating the general arrangement of an investment casting mold forming machine, the operation of which is controlled by the practice of this invention;

FIG. 15 is a diagrammatic exploded perspective view of the component parts of the reader, as viewed from the cover side of same;

FIG. 16 is a diagrammatic perspective view of the underside of the reader housing body showing in outline the circuit board that is to be applied to same and showing several of the contact fingers displaced therefrom;

FIG. 17 is a side elevational view of one of the contact pins on an enlarged scale;

FIG. 18 is a fragmental transverse cross-sectional view along a section line extending longitudinally of the reader slideway illustrating a pair of adjacent feeler contacts operatively engaged by one of the tape channel manual markings;

However, it is to be distinctly understood that the specific drawing illustrations provided are supplied primarily to comply with the requirements of the Patent Laws, and that the invention may have other embodiments which will be obvious to those skilled in the art, and which are intended to be covered by the appended claims.

GENERAL DESCRIPTION

Figure 10:
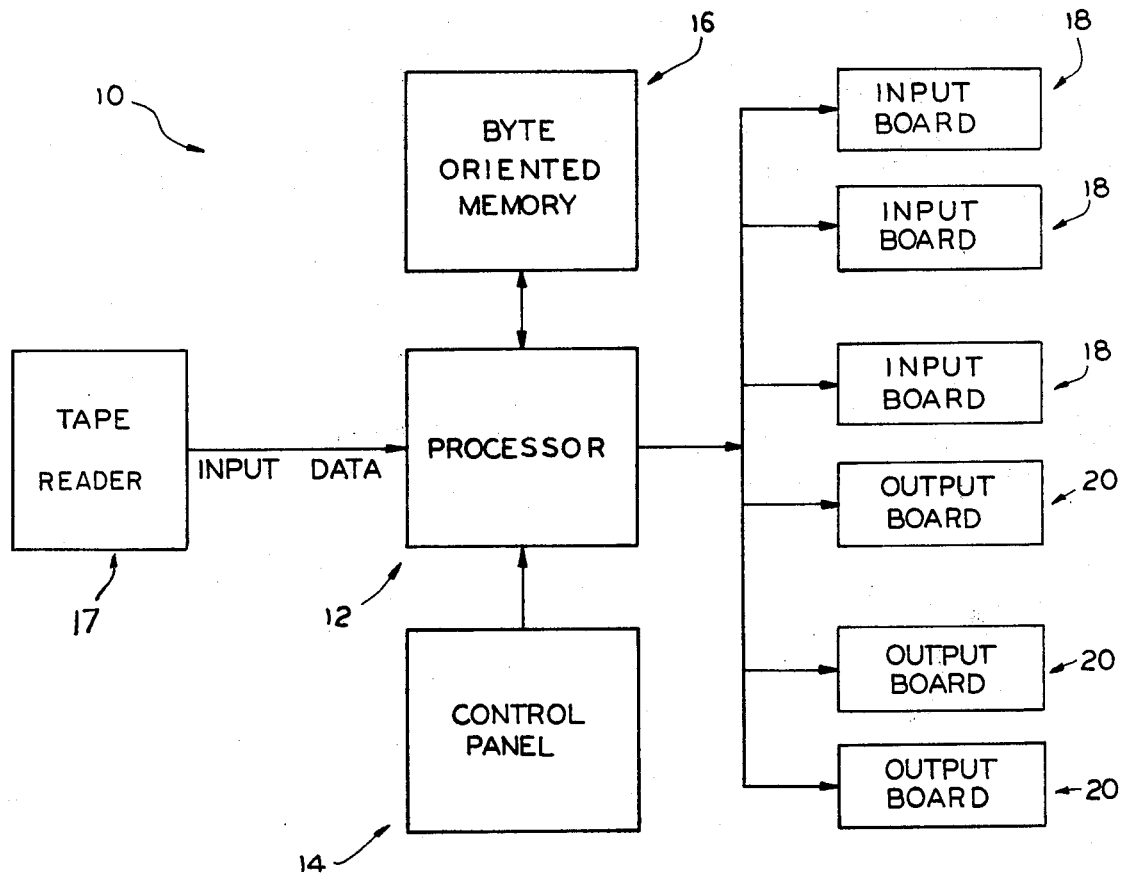
FIG. 10 is a diagram illustrating the basic arrangement of a programmable controller incorporating the invention.
Figure 14:
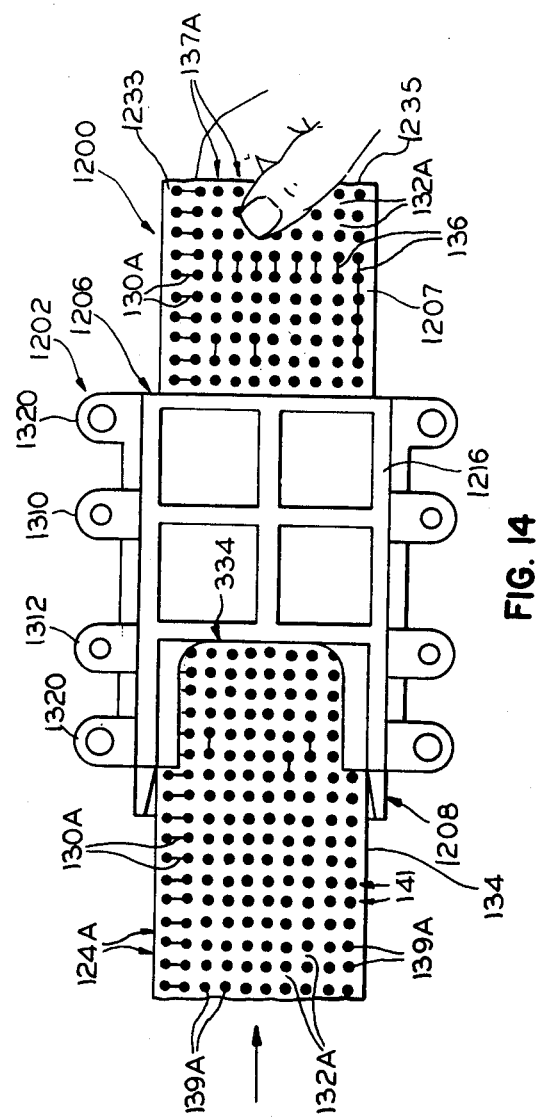
FIG. 14 illustrates a simplified and improved tape and reader arranged in accordance with the present invention, with the reader being shown in plan from the cover side of same and the tape being illustrated in the process of being manually pulled through the reader.

Reference numeral 10 of FIG. 10 indicates the general arrangement of a programmable controller in accordance with the present invention comprising the processor 12 operated from a suitable control panel 14 and having operably associated therewith a memory register 16, which in the illustrated embodiment is of the byte oriented type. Also operably associated with the processor 10 is tape reader 17 with the processor being connected by suitable data buss to the output and input modules shown in the form of input boards 18 and output boards 20.

Figure 11:
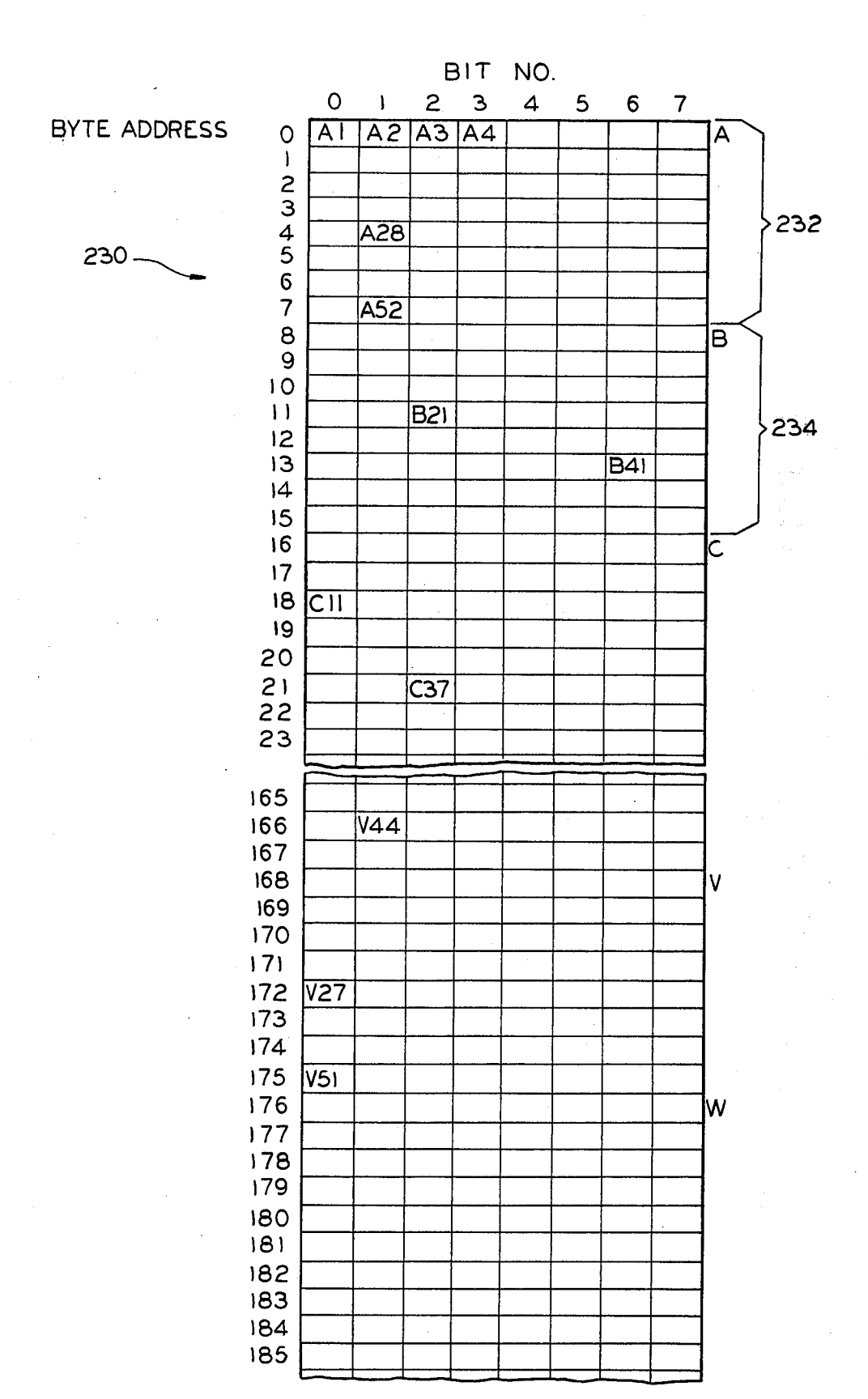

As indicated, in a practical embodiment of the invention the processor 12 may be, for instance, either a Fairchild F-8 microprocessor or an Intel 8080 microprocessor, both of which employ eight bit central processing units; a byte oriented memory is preferred and this preferably is of the random access (RAM) type (and thus is a "read/write memory") arranged as diagrammatically illustrated in FIG. 11. However, sequential access type arrangements, such as disc, tape, or bubble memory, may be employed.

It is assumed that power is supplied to the processor in any suitable manner and the input and output modules are appropriately connected to the processor and the processing machinery involved in any conventional manner.

For purposes of disclosure, it is assumed that the programmable controller is to control the operations of a manipulating dipping machine for making investment casting molds, the general arrangement of which is diagrammatically illustrated in FIGS. 12 and 13 wherein the mold forming machine 21 is shown to comprise a manipulative arm 22 having a base section 23 and a projection section 24 equipped with a clamping head 26 adapted to be secured to a cluster 40 of mold forming patterns consisting of a number of identical patterns 42 which are suitably secured to a sprue form 44 that includes a suitable adapter for securement of the cluster 40 to the clamping head 26.

The manipulative arm base section 23 is connected to a trolley 30 movable (by suitable drive means) up and down a vertical post 32. Post 32 is mounted for rotation about its longitudinal axis, as indicated by arrow 34. The manipulative arm base section 23 is connected to the trolley 30 for rotation about a horizontal axis to swing the cluster 40 in a vertical plane (see FIG. 13), as between the upright position shown in FIG. 12, wherein the manipulative arm sections 23 and 24 are in coplanar relation with the post 32, and angled or inverted positions illustrated by the showing of FIG. 13 (360 degree rotation is provided for). Provision is also made to rotate or spin cluster 40 about the axis of sprue form 44, in any suitable manner, when the cluster 40 is suspended from arm 22, as in the full line position of FIG. 12.

The dipping machine 21 is arranged to make investment casting molds by employing a dipping procedure, in accordance with which the cluster 40 of patterns 42 is suspended from the manipulative arm 22 utilizing the clamping head 26, as indicated in FIG. 12. The manipulative arm 22 is moved vertically of and circumferentially about the post 32 between a plurality of tanks 70 disposed about same so as to take the mold cluster 40 through a series of dipping operations into and out of the respective tanks 40 as part of the predetermined procedure or method for forming the individual molds about the patterns of the pattern cluster 40. When the final dipping step has been completed, the apparatus 22 moves to a predetermined "start-finish" position for removal of the completed mold cluster 40 and application thereto of a fresh pattern cluster.

Operably associated with the machine 21 is a programmable controller 80 that is arranged in accordance with the present invention and includes the components shown in diagrammatic block diagram form in FIG. 11. In the form shown, suitable housing 82 mounted on pedestal 84 encloses the programmer and its control panel.

The machine 21 having been designed to go through a series of manipulative steps in processing the mold clusters to be handled by same, it follows that the operative parts of the machine 21 may be controlled by a programmable controller to follow a predetermined series of sequential operational steps to fully process the individual mold clusters.

In the practice of the invention, the various inputs and outputs for controlling the operation of the machine 21 are itemized and the sequence of their operation related to the various individual sequential movements of the manipulative arm that are to take place, which would be the individual consecutive steps that the machine 21 goes through in processing the individual mold clusters from start to finish.

Figure 1:
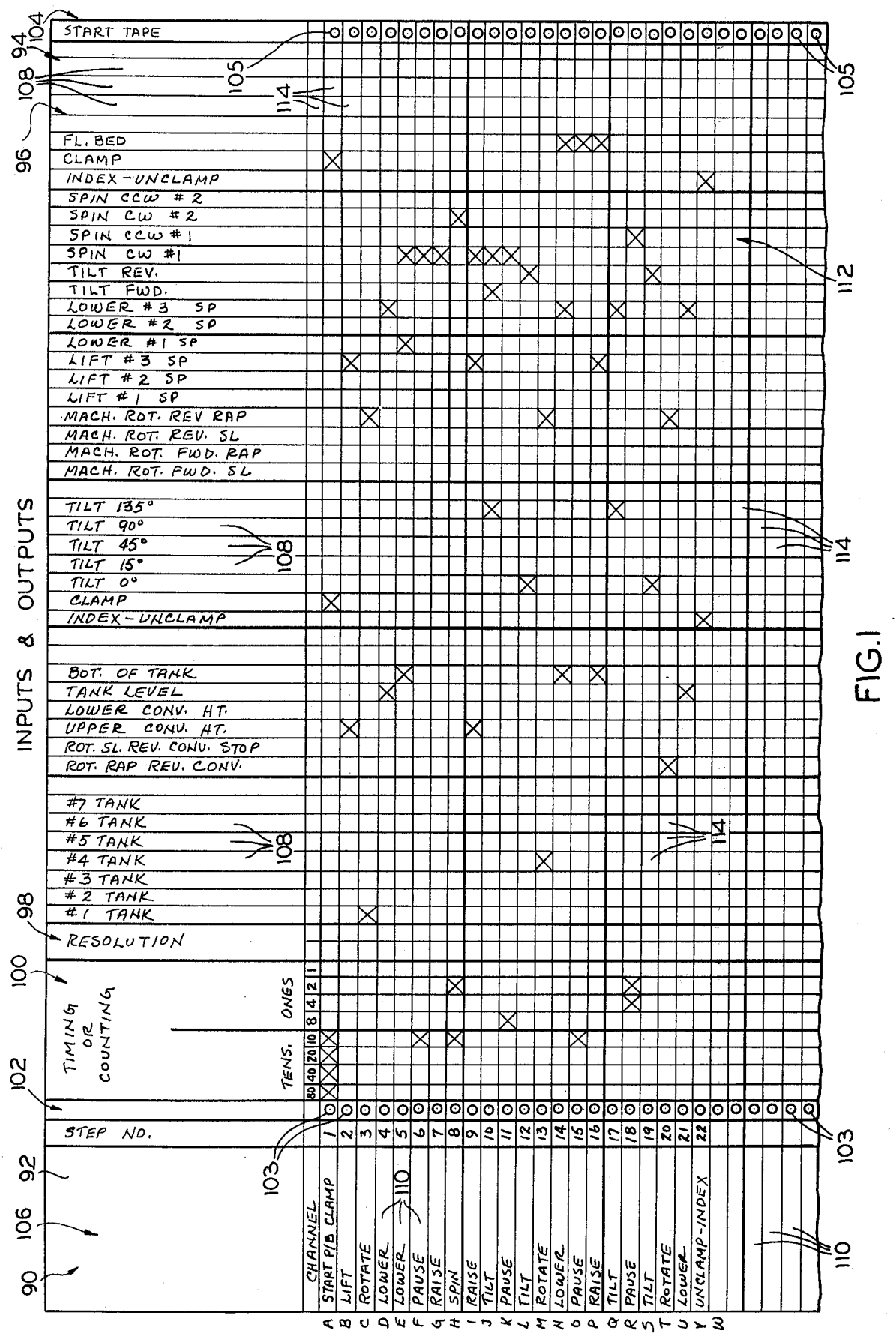

With this information at hand, the work sheets 90 of FIG. 1 are prepared.

The work sheet 90 comprises a suitable substrate 92 that is formed or delineated on one side or face of same to define across the top of same a control zone 94 having an input and output subzone 96, a resolution subzone 98, and a timing or counting subzone 100. Zone 94 is interposed between the spaced apart vertically disposed tape locater columns or zones 102 and 104.

Work sheet 90 is also formed to define or delineate a step zone 106 that in the form shown extends across the left hand end of the substrate 92.

The work sheet 90 is further delineated to define in the control zone 94 a plurality of vertical columns 108 that are extended to the lower edge of the work sheet, while the step zone 106 defines a plurality of horizontal channels 110 which are extended across the work sheet to the right hand edge of same and in intersecting relation with the columns 108.

The intersecting columns 108 and channels 110 lie in the work sheet computer word zone 112 wherein the intersecting columns 108 and channels 110 define a plurality of data bit receiving blanks 114 that are adapted to be manually marked in accordance with the practice of the invention.

In utilizing the work sheet 90, the inputs and outputs involved in a particular program are listed across the input and output zone 96 in the manner suggested in FIG. 1, while the consecutive steps to be sequentially followed in operating the apparatus controlled by the program in question are listed in consecutive channels 110 within the step zone 106. Thus, each input and output is assigned a vertical column 108 while each step of the process to be controlled is assigned a channel 110. While the process steps must be listed in sequential order (that is, in the order in which they occur), the listing of the inputs and outputs need not be in any particular order.

The resolution subzone 98 in the form shown may be provided for working time delays into the procedure, while the time or counting subzone 100 is concerned with providing the controlling data that starts the program action when the programmer is put into operation and also may provide for no operation of a particular step and a going immediately to the next step, or possibly reserving a step for later insertion in the program. Steps removed from the program can be replaced with data indicating no operation. This aspect of the system will be determined in light of known technology on this subject by the nature of the machinery to be controlled and the type and nature of the process involved.

The work sheet tape locater zone 102 and 104 preferably have formed in same for each channel 110 the respective indicia 103 and 105 that are to indicate the ends of the respective computer words to be formed by using channels 110 and manually marking same, as will now be discussed.

With the work sheet 90 laid out in the manner indicated, and the operator, having in mind the steps to be performed in the process, the sequence of the steps, the inputs and outputs involved, and other control features that may be necessary or desirable, including the aforementioned resolution and timing or counting, can manually mark the work sheet 90, in the area of the spaces 114, to indicate, utilizing the binary notation system, when something is to happen. Assuming that spaces 114 left blank mean nothing is to happen and spaces 114 suitably marked indicate that some control action is to be taken (which is comparable to the zero and the "1" of the binary system), the engineer having determined what is to happen with reference to the various machinery components being controlled during the operation of the method, can mark the appropriate blank spaces 114 accordingly, as by employing the letter "x" (as indicated), a check mark, or the like.

In accordance with the invention of said application, the portions of the channels 110 extending between the tape locater zones 102 and 104 become computer data word areas or channels that are coextensive with the summation of the data bit blanks 114 lying in each of such channels 110. With the channels 110 marked as indicated for a particular program, the data bit information of the respective channels 110 in summation thus comprises the computer data word for each step of the process being controlled. It is an important aspect of the invention that as the data bits involved for each process step have been oriented in computer work form, the words for each step may be transmitted from the work sheet into the process or memory without requiring ladder diagram technology or the like.

For this purpose, the invention of said application contemplates that the computer words defined by work sheet 90 be manually formed on a tape for passing through a suitably equipped tape reader that will sense the computer words in question and insert them in the processor memory in preparation for operation of the controller. As herein disclosed, the types of tapes and tape readers that may be employed may be of several different types consistent with the objectives of the invention. The basic idea involved in each type is that each tape is formed to define a plurality of longitudinally extending channels that are proportioned laterally of the tape to be aligned or centered with the channels 110 of the work sheet 90. The number of such channels employed in a particular tape may be as desired, depending on the particular type of processor equipment employed. Since eight bit equipment has been suggested, the tapes as arranged for use with such equipment should have at least eight of such channels and be sufficiently wide to provide for applications thereto of synchronization markings or their equivalent for proper timing relation with the tape reader employed.

In any event, in accordance with the invention, the computer words of the work sheet 90 are transferred to a tape arranged in accordance with the invention by manually marking the tape to reflect the data markings and the word end indicia, on the tape, for each computer work involved. This is done in practice by taking one end of the tape (which is to be the leading end of the tape) and marking it manually to show both the location of the computer word end indicia for the first eight channels 110 of the work sheet 90, and the manual markings of the areas 114 contained therein. This being completed, the computer words of the first eight steps of the process have been applied to the tape leading end; then the next adjacent portion of the tape is marked in like manner with the next set of eight steps of the work sheet in like manner, and so on, until the computer words of all the process steps of the program have been applied to the tape. This completes the preparation of the tape. When the controller is to be programmed using the tape, the tape is passed through the reader to effect insertion of the program now outlined on the tape into the controller memory to form the controller data base, with the individual computer words of the respective process steps in sequential orientation, and the individual groups of eight computer words of the process steps in consecutive series or serial relation.

It will thus be seen that the invention contemplates the formation of the computer words for each step on the work sheet, by manually marking the work sheet as needed for a particular program, to fill in the computer words between the word end indicia of each channel 110, and then effecting transmittal of the data provided by each computer word, in computer word form, into memory via the tape and tape reader.

In the form of FIGS. 2 and 3, a tape 120 is illustrated comprising a ribbon or web 121 of a suitable translucent or transparent material that is at least sufficiently translucent so that when laid across the channels 110 the markings in the spaces 114 and the indicia of columns 102 and 104 will be clearly aparent when looking through same, (as well as, of course, the lines forming columns 108).

The tape 120 and the tape reader it is to be associated with are of the electrical contact data transmitting type, with the tape 120 being delineated, by employing nonelectrically conductive ink or the like, a plurality of longitudinally extending channels 122 (defined by longitudinal lines 123) that are intersected by transversely extending columns 124 defined by transversely extending lines 125. The channels 122 and the columns 124 are respectively proportioned to be congruent with the respective channels 110 and columns 108, so that when the tape 120 is placed on top of work sheet 90, the columns 124 may be matched with columns 108 and channels 123 may be matched with channels 110 in practicing the invention.

As indicated, since eight bit processing apparatus is employed in the suggested embodiment, the channels 122 should be a minimum of eight in number. For tape reader synchronization purposes, marginal channels 127 are provided along the side edges 126 and 128 of the tape.

In this embodiment of the invention, synchronization markings 130 are applied along either both or one side edge of the tape, over or adjacent portions of lines 125, by employing electrically conductive ink, for effecting proper coordination of the data read by the tape reader and the location of the tape that this data appears. A suitable electrically conductive ink for this purpose is the Electrodag 502 product made and sold by Acheson Colloids Company of Port Huron, Michigan.

The tape as thus prepared is available for use and when used, one end of the tape is applied across the top eight channels 110 of the work sheet to initiate application of the computer word data to the tape. This is done by aligning the eight channels 122 of the tape with the top eight channels 110 of the work sheet at the tape end and aligning tape columns 124 with columns 108 of work sheet 90. The technician then manually marks on the tape, in the data bit blank spaces 132 defined by the tape intersecting channels 122 and columns 124, a marking 134 in electrically conductive pencilling or the like, corresponding to the marked areas 114 of the work sheet channels 110 in question. This is also done as at 136 with reference to the work end indicia 103 and 105 that are applied to the respective work sheet zones 102 and 104, to indicate on the tape the ends of the respective computer words for each step of the program. Tape 120 may be provided with a pair of guide lines 135 for each channel 122 to delineate within the respective channels 122 guide channels 137 where markings 134 should be applied.

For purposes of practicing the embodiment of FIGS. 2 and 3, the program data markings 134 corresponding to the computer work data bits of work sheet 90, and the markings 136 corresponding to the location of the computer word end indicia 103 and 105, are proportioned with reference to the distance between pertinent operating contacts of the reader, as diagrammatically illustrated in FIG. 3, for purposes of closing same to effect a data sensing action by the reader. As indicated in FIG. 3, the tape reader is arranged following available technology to provide a plurality of spaced contacts 140 aligned in the rectilinear manner indicated in FIG. 3 and suitably connected to a source of electrical power, and spaced from similarly aligned contacts 142 that are suitably oriented in spaced relation from the contacts 140 and respectively connected by lead lines 144 to the relevant portions of the reader for effecting the binary numbering system type sensing needed to convert the indicated work sheet and tape manual markings into electrical pulses.

As is common with tape readers of the electrically conductive sensing type, synchronization contacts 148 are provided in spaced relation to the respective end contacts of the set of contacts 140.

Following technology at the time of filing of my said application Ser. No. 797,579, the tape reader and are proportioned and arranged and the contacts 148 are spaced from the respective end contacts 140, such that as the tape moves through the reader, the tape 120 is suitably guided for appropriate centering relative to contacts 140, 142 and 148, and the synchronization markings 130 all electrically connect the respective sets of adjacent contacts 140 and 148 as the tape moves across contacts 140. Assuming that contacts 140 are connected to a suitable source of electrical energy, markings 130 sequentially close the circuits between the respective sets of contacts 140 and 148 to effect synchronization signal generation by reader 17.

In addition, the spacing of the individual contacts 140 from the contact 142 paired with same, longitudinally of the path of movement of the tape, is made approximately the width of a column 124, and the electrically conductive markings 134 are proportioned to extend the full width of the respective columns 124 so that as a particular column 124 of the tape passes over the contacts 140, the respective contacts 140 will be briefly in electrical connection with the respective contacts 142 aligned therewith longitudinally of the tape for generation of the electrical impulses that are to represent the data content of each data word. The computer word end markings 136 are similarly proportioned for similar purposes. Lines 135 are positioned on tape 120 to insure markings 134 will be lined up with contacts 140 and 142 as the tape is passed through the reader.

It will be apparent, of course, that the manually applied markings to the tape 120 are all on the same side of the tape, and the tape reader 17 is arranged so that as the tape 120 is pulled through the reader the manually applied markings involved are presented for engagement with contacts 140, 142 and 148.

Thus, as the tape 120 passes through its tape reader, for each set or group of the channels 122, the word end markings 136 are first sensed to start the reading of the computer words involved in this group of columns 122, followed by the markings 134 representing the individual data bits of each computer word channel involved, with the trailing set of markings 136 effecting completion of the reading of the respective computer words involved into the reader for conversion into the electrical impulses that will effect insertion into memory of the data involved. Succeeding groups of computer words are handled in like manner. The synchronization markings 130 serve their conventional function of actuating the reader sensing mechanism when it is to be conditioned to sense a manually marked data marking on the tape.

The tape 120A of FIG. 3A is a simplified version of tape 120, with longitudinal lines 123 being eliminated except for the edge margin lines 123A. Guide lines 135A are darkened and made full line in character, and define guide channels 137A in which markings 134 are manually applied. In this embodiment guide channels 137A have imprinted therein electrically conductive ink marking guide blocks 139 arranged transversely of tape 120A in columnar form to define columns 124A and replace transverse lines 125 that are eliminated. Synchronization markings 130A, comparable to markings 130, formed by electrically conductive ink, are applied to tape 120A along either side of same and in alignment with the transverse columns 141 of blocks 139. Blocks 139 and markings 130A are on the same side of the tape 120A for cooperation with reader contacts 140, 142, and 148 in the manner described regarding tape 120. Lines 123A and 135A are suitably formed from non-conductive ink. Manual markings 134 are applied in the data bit blank spaces 132 defined by the tape intersecting channels 137A and columns 124A (represented by the spacing between adjacent guide blocks 139 of the same guide channel 137A).

When markings 134 and 136 are applied to tape they will have a generous overlap relative to contacts 140 and 142 when aligned with same.

With reference to the showings of FIGS. 4 and 5, tape 150 is arranged for reading by the photo type tape reader generally indicated at 151 in FIG. 5.

Tape 150 is fundamentally similar to tape 120 and comprises a ribbon or web 152 suitably delineated or marked to define channels 154 that are comparable to channels 122 of tape 120 and edge channels 156 that are comparable to marginal or edge channels 127 of tape 120. Also suitably delineated on tape 150 are the transversely extending columns 158 that are comparable to the columns 124 of the tape 120.

The channels 152 and columns 158 thus define the individual data bit marking areas 160 lengthwise of the tape 150.

The tape 150 along one of its edges 157 is formed to define the usual synchronization markings 158 in alignment with each column 158 of the tape.

Again the web or ribbon from which the tape 150 is made should be transparent or at least translucent for application to the work sheet in the manner indicated with regard to the tape 120. The tape 150 is manually marked to fill in those data bit areas 160 that correspond to the areas 114 of work sheet 90 having a manual mark in them. Also, the appropriate areas 160 are marked to indicate the ends of the respective computer words, as will be indicated by the appearance of indicia 103 and 105 through the tape.

The tape 150 is manually marked for the respective groups of process steps following the general explanation given with regard to tape 120 with the result that the data bit markings for each of the processing steps are applied to the tape 150 in computer word form that extends longitudinally of the tape. Similarly, the computer words for each process step are applied to the tape 150 in the indicated groups of eight for serial application into the processor memory utilizing reader 151.

The tape reader 151 is a diagrammatic illustration of the Decitek Reader, made and sold by Decitek, of Worchester, Massachusetts. The reader comprises a phototransistor array generally indicated at 162 suitably mounted oppositely of, and precisely aligned with, a light emitting assembly 164 of the fiber optic type, with the reader being arranged to provide nine discrete beams 166 with which the channels 154 are aligned, the ninth beam being aligned with the edge channel 156 that bears the synchronization markings 158. The light source is a suitable derated lamp 168. As this invention contemplates that the tape 150 will be pulled through the reader 151, the drive sprocket arrangement of the indicated Deticek reader may be omitted and suitable edge guides for tape 150 being provided.

Tape 150 may be adapted for reading by a magnetism sensing reader by the data bit areas 160 (that correspond to the areas 114 of work sheet 90 having a manual mark in them) being marked with ink or pencilling having magnetic material in same, or using decals (to cover such areas 160) that are formed from the same material that magnetic tape used in magnetic tape recorders is made from. The resulting prepared tape is read by passing it through a reader similar to reader 151 but equipped to apply electronic beams with which the channels 154 are aligned, with the synchronization markings 158 being formed by magnetic inking for sensing by the ninth beam that is to be aligned with edge channel 156.

Referring now to FIGS. 6-8, tape 180 comprises a ribbon or web 182 delineated to define columns 184 that are comparable to columns 124 of tape 120, and in addition, the tape 180 is formed with perforations 186 that are located corresponding to the location of the data bit areas 132 and 160 of the tapes 120 and 150, respectively. The perforations 186 are aligned in rows extending longitudinally of the tape to define data word channels 188 comparable to channels 122 and 154 of tapes 120 and 150 as well as a channel 190 along one edge 192 of the tape 180 for synchronization purposes.

The perforations 186 are spaced apart longitudinally and transversely of the tape 180 so that when the tape 180 is applied to a group of eight channels 110 of work sheet 90, the perforations of the channels 188 will be centered with the data bit receiving spaces 114 of the channels 110 involved.

The tape 180 is manually marked to provide the same type of data transfer capability as tapes 120 and 150 by employing adhesive pads or covers 194 or the like at the locations corresponding to the manually marked surfaces 114 of the work sheet 90 as well as the word end data indicating indicia 103 and 105 of work sheet 90, as indicated by the showing of FIG. 6. The pads or covers 194 are proportioned to fill and cover those of the perforations 186 that correspond to the location of the manually marked surfaces 114 of work sheet channels 110 and the indicia 103 and 105 thereof.

The programming data of the work sheet 90 is applied to tape 180 utilizing the same work sheet overlaying procedure and application of the pads 194 to the appropriate tape perforations 186 involved corresponding to the location of the manual markings in each of the spaces 114 of the respective columns 110, using the channel group overlay procedure already described. The covers or pads 194 used are to removably adhere to tape 180.

The tape 180 may have its data read by applying same to a star wheel type tape reader, such as the Model TR30 terminal paper tape reader made and sold by Electro-Mechanisms, Inc. of Wayne, N.J. FIGS. 7 and 8 diagrammatically illustrate the tape reading components of the general type of reader involved, the reader being generally indicated by reference numeral 200. As illustrated, for each channel 188 of tape 180, these readers are to be provided with a movable wire common contact 202 having its contact end 204 normally biased against fixed contact 206. The star wheel mechanism 207, for each such channel 188 involves swing arm 208 pivotally mounted as at 210 and rotatably mounting star wheel 212 having four arms 213 in walking engagement with the channel 188 perforations 186 of a tape 180 as trained over suitable capstan 214 having alignment lugs 216 that seat in the perforations 186 of the tape column 190. The swing arm 208 includes a finger 218 through which the contact wire 202 passes, with the proportioning of the swing arm 208 and star wheel 212 being such that when the legs of the star wheel seat in a tape perforation as indicated in FIG. 8, the wire contact 202 is in engagement with contact 206, but when the star wheel legs bear against an area of the tape 180 where a perforation 186 is closed by a pad 194, the contact 202 has its end 204 biased against the contact 220.

As indicated, the reader 200 has a separate contact and star wheel assembly comparable to that shown in FIGS. 7 and 8 for each tape column 188.

It is preferred that the tape reader 200 be arranged for manual pull through of the tape 180 therethrough. Assuming a tape 180 has been manually marked in the manner indicated to reflect the programming data applied to a work sheet 90, on pulling of the tape through the reader, the data in computer word form as applied to the tape 180 is applied in computer word form to memory through reader 200.

The pads 194 may be of any suitable nature that either fill perforations 180 or cover same and removably adhere to type 180 to preclude the star wheel legs from entering those perforations 186 that correspond to a data bit manual marking of the work sheet 90 and the location of the computer word ends.

The manual pull through tape approach contemplated by this invention requires that the tape be pulled through the reader starting with the tape end to which the first group of computer words, corresponding to the first group of process steps of work sheet 90, are applied. Thus, the other end of the tape should not be the lead end of the tape insofar as application to the tape reader is concerned. This applies to all embodiments disclosed.

Figure 9:
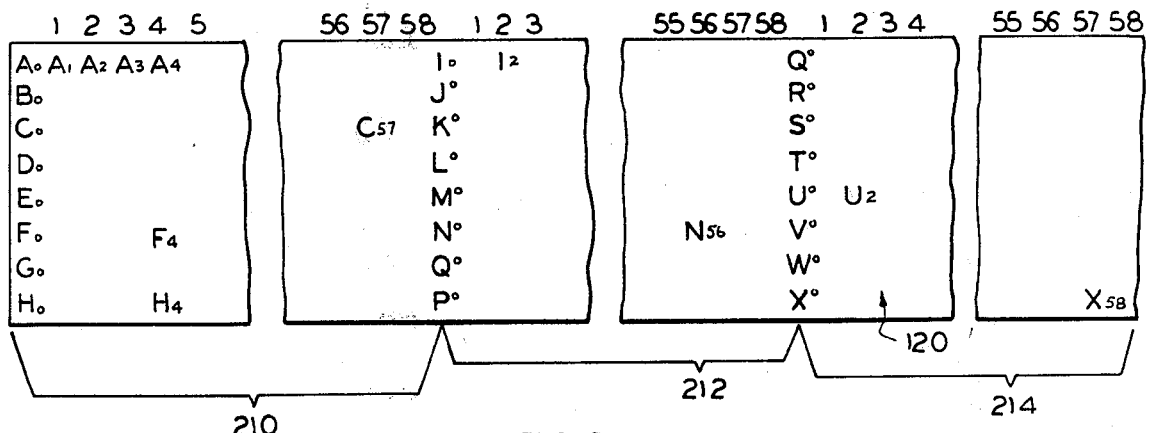
FIG. 9 illustrates the tape in block diagram form in association with a tape mark designation system for indicating corresponding location of the data bits applied to the tape and their location in the computer memory.

FIGS. 9 and 11 are provided to diagrammatically illustrate the relation between the location of the computer word oriented data bits on the read out tapes and the corresponding location of the data involved in the memory register, in accordance with the invention. In FIG. 9, tape 120 is shown in block diagram form.

In the showing of FIG. 1, fifty-eight vertical columns 108 are provided on work sheet 90 to provide a computer word length of fifty-eight equal subdivisions which are represented by the numbers 1–58 along the top edge of the tape diagram shown in FIG. 9 (which is assumed to represent tape 120). The numerically numbered steps in the step column of step zone 106 are consecutively lettered to designate, for instance, step channels 1–8 of work sheet 90 as step channels A–H. Thus, in the showing of FIG. 1, at the tape word defining section 210 at the left hand end of the tape 120, the alphabetic letters involved represent the corresponding computer words of the respective steps 1–8, while the locations indicated by numbers 1–58 indicate the corresponding locations of the inputs and outputs and other categories of the zone 94 or work sheet 90. Similar remarks apply to the next set of process steps 9–16, which are represented at tape section 212 by alphabetical letters I–P starting the said next computer word section 212 of the tape; similarly, letters Q–X designate the computer words for the next tape section 214, etc. The alphabetic letters of FIG. 9 are shown at locations corresponding to the locations of the tape that will bear the tape manually applied marks which will correspond to the computer word end indicia 103 and 105.

Thus, each series of computer words applied to the tape at the same word length section may be considered to be subdivided into subdivisions corresponding to the locations of the data bit areas 114 of the work sheet 90 and appropriately identified by the markings indicated in FIG. 1. For instance, for the program step 1, which is designated as step A in the showing of FIG. 1, the first four subdivisions of the tape in the tape channel for step A may be considered subdivided as A1, A2, A3, A4, etc. in correspondence to the areas 114 of work sheet channel 110 that represents step 1 (or step A) of the process programmed. The other channels 122 of the tape may be considered similarly subdivided as B1, B2, B3, B4; C1, C2, C3, C4, etc., for the full 58 spaces of each word length involved.

With this imaginary cross grid in mind, the location of any data bit marking of the work sheet may be appropriately correlated with the corresponding location of same in or on the tape employed as well as in the memory register, which is diagrammatically illustrated at 230 in FIG. 11. The register 230 is shown diagrammatically in grid form to better illustrate the memory map of the register, indicating byte address, bit number (0–7), and word location (word A, word B, etc. corresponding to process step A, process step B, etc.) as well as indicating the location of the particular data bits in the particular word maps. The section 232 of the memory grid between A and B corresponds to the data word for step 1 or A of work sheet 90; the next section 234 of the grid 230 between B and C represents the computer word location and subdivisions therefor for the second step or step B of the process of the work sheet 90, etc. In the showing of FIG. 11, the data bit manual entries of work sheet 90 are shown entered in their corresponding locations in the memory register as indicated by the numbering and letter designations described (in this connection, the work sheet 90 employs only two data bit spaces 114 aligned with resolution subzone 98, and for the particular memory register illustrated in FIG. 11, only the bit locations A9 and A10 (at byte address 1) are used, the remaining bit locations A11–A16 remaining permanently blank for this program). As the source of data, for data bit location A10, on work sheet 90 is juxtaposed to the source of data both on work sheet 90 for data bit location A11 (the No. 1 tank columns) and the tape employed, in the memory register, the data bit entry for location A11 is entered in the memory register a bit location O of byte address No. 2 with subsequent data bits from word space areas to the right of the column 108 for tank No. 1 (of work sheet 90) and from the corresponding portions of tape 120 being entered at numerically succeeding data bit locations of the register 230. This means that for the particular program illustrated, each computer word section of the memory register will have only fifty-eight active locations rather than the sixty-four possible locations per computer word suggested by FIG. 11. The same is true for the computer word locations of register 230.

Of course, the memory register 230 may be arranged to provide any desired number of data bit locations for the computer words involved, which will ordinarily depend on the number of inputs and outputs and other control items employed and designated in the zone 94 of work sheet 90.

A characteristic feature of the invention thus is that as the tape for a particular program is pulled through the tape reader in accordance with the invention, the data bits of eight computer words are simultaneously applied to memory, to be followed serially by the data bits of the next succeeding set of eight data words, etc. until the program has been entered into memory.

For operational purposes, the arrangement is made such that a full word length of blanks or zeros at the end of the memory register (located corresponding to step position W on work sheet 90) designates the end of the program, for conditioning the controller in a conventional manner to repeat the program under the control of the control panel mechanisms.

With the program of work sheet 90 entered into the controller memory, the controller is operated as previously indicated, first to test the program, and then to effect automatic sequencing through the program, as per the basic function of the controller, as will be apparent to those skilled in the art.

FIGS. 14 through 19 illustrate a yet further simplified tape 1200 and the specifics of reader 1202 through which the tape 1200 is passed, to enter into the processor memory the program involved, as represented by the computer data word groups or sets that are applied to the tape 1200 in accordance with the invention. These components are disclosed in my said application Ser. No. 932,475, and represent the best mode of practicing these aspects of the invention now known to the Applicant.

The tape 1200 is generally similar to the tape 120 and defines guide channels 137A and columns 124A by utilizing the equally spaced guide dots 139A that are aligned longitudinally of the tape to define the respective channels 137A that are to be aligned in centered relation with the work sheet channels 110, and to define also the columns 124A that are to be matched with the columns 108 of the work sheets. The guide dots 139A are also aligned in columns 141A that extend transversely of the tape, and synchronization markings 130A, corresponding to markings 130, are provided, which are aligned with the respective columns 141A transversely of the tape along one side edge 128 of the tape 1200. The spaces between the guide dots 139A of the respective channels 137A define the tape data bit blanks 132A, corresponding to blanks 132 of tape 120.

In the embodiment of the invention represented by the tape 1200, the tape is in the form of a suitable polyester material, such as the Mylar brand polyester tape made and sold by E. I. Du Pont Demours Company of Wilmington, Delaware. The tape is preferably defined by a ribbon 1204 formed from the indicated polyester material, and which is preferably either transparent or at least sufficiently translucent so that when laid over the face of the work sheet 90, the columns 108 are the channels 110 of the work sheet will be visible through the tape.

The guide dots 139A and the synchronization markings 130A are imprinted on the same side of the tape, and by employing electrically conductive ink, and the programmed data markings 134 corresponding to the computer word data bits of work sheet 90, and the markings 136 corresponding to the location of the computer word indicia 103 and 105 of the work sheet, are applied to the same side of the tape that guide dots 139A are on. Thus, in the tape 1200, all the imprinting and manual marking is applied to the tape side 1205, as distinguished from the tape back side 1207, and by employing electrically conductive ink. The tape itself is electrically non-conductive.

Where the tape 1200 is made from clear or transparent film, such as the aforementioned polyester film, where the manual markings 134 and 136 are to be made using graphite lead pencil (which is preferred because of its ready availability), the tape side 1205 should have a suitable matte antistatic coating, such as the type commonly employed to provide a premium grade drafting surface. This allows an ordinary graphite lead pencil to deposit a low resistance electrically conductive path between adjacent guide dots 139A, to form markings 134 and 136. The antistatic property of the coating helps prevent dirt adherence to the coated side of the tape.

Film of the matte coated type indicated is commercially available, one source being Transilwrap Company of Chicago, Ill.

Where ink is employed to make the markings 134 and 136, the matte coating is not required.

The tape reader 1202A (see FIGS. 15 and 16) is arranged in accordance with the basic objective of the invention to provide for manual application of the tape to the reader and manual pull through of the tape through the reader to effect entry of the computer word data involved into the processor memory.

The reader 1202 comprises a housing 1206 that includes a housing body 1208 having applied to its underside 1210 a circuit board 1212, and having applied to its top or upper side 1214 a cover or cap 1216.

The housing body 1208 is of one piece molded construction and is formed from a suitable electrically insulating material that preferably, but not necessarily has self lubricating, thermoplastic characteristics. While a material such as a suitable Bakelite composition will be satisfactory, it is preferred that the material be a self lubricating polymeric material such as nylon. In a specific embodiment of the reader 1202, the housing body 1208 is formed from nylon containing a suitable amount of mylybdenum disulphide, utilizing suitable injection molding techniques.

The body 1208 is generally planar or flat in longitudinal configuration with its underside 1210 being planar for application thereto of circuit board 1212. The upper side 1214 of the body is recessed or slotted as at 1220 to define a slot way 1222 having a planar floor 1224 that extends between the tape entering end 1226 of the slot way 1222 and its exit end 1228. The slot way 1222 on either side of same is defined by upstanding opposed side walls 1230 that are spaced apart a distance which complements the transverse dimension of the tape 1200, except at the entrance end 1226 of the slot way 1222, wherein the side walls 1230 are outwardly angled as at 1232 to facilitate the insertion of the leading end 1233 of the tape 1200 into the reader.

The housing body 1208 is formed on either side of same with a pair of inner lugs 1236 and a pair of end or outer lugs 1238 for reception of securement screws in a manner to be described.

The housing body 1208 between two of the transversely aligned lugs 1236, on either side of the housing body, is formed with two rows of contact assembly receiving bores 1240 and 1242, of which a bore 1240 and a bore 1242 are aligned, as a pair, longitudinally of the path of movement of the tape through the reader, and thus longitudinally of the longitudinal direction of the slot way 1222. As indicated in FIG. 18, the bores 1240 and 1242 each receive a contact assembly 1244 comprising a contact finger or pin 1246 and a biasing coil spring 1248 therefor. The fingers or pins 1246 each comprise a shank 1250 of cylindrical configuration having an external diameter approximately complementing the internal diameter of the respective bores 1240 and 1242 for smooth sliding action of the fingers 1246 longitudinally of the respective bores. Each contact finger shank 1250 at its head end 1252 is formed with an upstanding stud 1254 terminating in a spherically contoured end 1256 to define a contact head portion 1258 for the shank 1250. It is the contact finger or pin head portions 1258 that cooperate with the tape 1200 in the operation of the reader.

The finger shanks 1250 each define planar ends 1260 against which the springs 1248 seat.

The circuit board 1212 comprises a suitable substrate formed from a material suitable for making circuit boards (such as a suitable thermosetting rein reinforced with fiberglass or paper) which has imprinted on its side 1269 two rows of contact seats 1270 and 1272 that are disposed and oriented in location and number to be aligned with and centered in the respective housing body bores 1240 and 1242, respectively, as indicated in the drawings.

In accordance with this embodiment of the invention, the housing body bores 1240 and 1242 and the contact seats 1270 and 1272 aligned therewith are also spaced and oriented for alignment with the channels 137A of the tape 1200 when applied to the reader. In addition, the housing body 1208 includes two additional sets of the bores 1240 and 1242, indicated by reference numerals 1240A and 1242A, centered and aligned correspondingly located extra sets of contact seats 1270A and 1272A, which each have a contact assembly 1244 associated with same and positioned and oriented for alignment with the synchronization markings 130A, all in the manner best indicated in FIG. 19.

The contact assemblies 1244 applied to the respective bores 1240, 1240A and 1242, and 1242A, are thus the same, with the contact assemblies 1244 applied to the respective bores 1240 and 1242 acting between the respective seats 1270 and 1272 and the tape 1200, while the contact assemblies 1244 applied to the respective bores 1240A and 1242A act between the respective contact seats 1270A and 1272A and the tape 1200. The arrangement is such that the spherically contoured end surfaces 1256 of the contact finger heat portions 1258 are to be in sliding contact with the tape, and on the side 1205 of same that bears the guide dots 139A, the synchronization markings 130A, the program data markings 134, and the computer word end indicating markings 136.

Figures 19, 21:
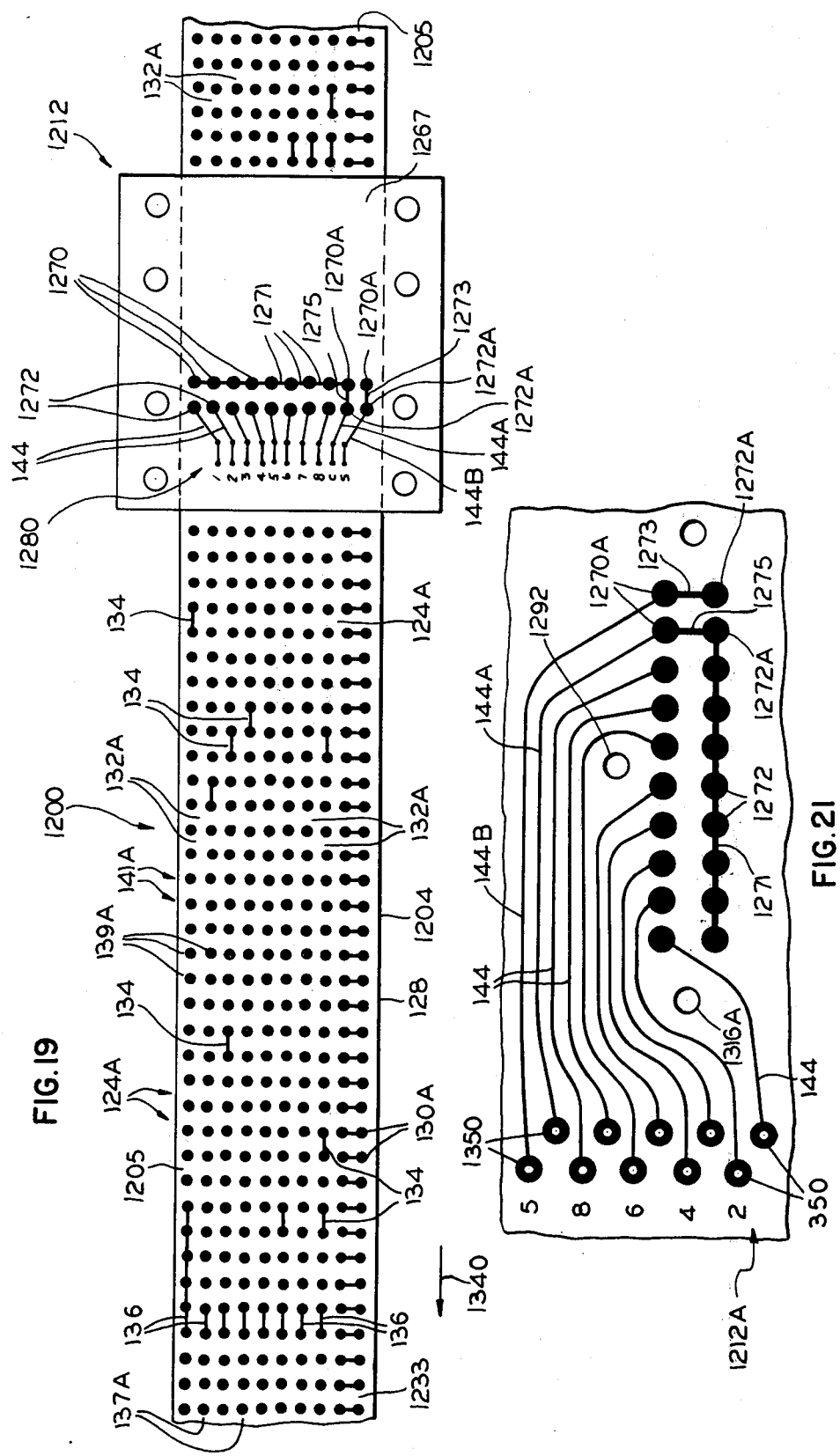
FIG. 19 is a diagrammatic plan view illustrating the tape and circuit board of the reader oriented in operative relation (as viewed from the underside of circuit board as shown in FIG. 15) to better illustrate the manner in which the tape manual markings become operatively associated with the reader contacts.
FIG. 21 is an enlarged view of the reader circuit board contact seats and related circuitry shown in FIG. 20.

In the specific embodiment of the invention illustrated in FIGS. 15 through 19, the contact seats 1270 are all electrically connected (by connectors 1271) except for the end contact seat 1270A that is closest to the adjoining side edge of the slot way 1222. This end most seat 1270A is electrically connected (by connector 1273) to the seat 1272A aligned with same while the other seat 1270A is electrically connected (by connector 1275) to the seat 1272A aligned with same, as indicated in FIG. 19. Lead lines 1144 electrically connect the respective contact seats 1272 to the wired reader connections applied to the circuit board in a conventional manner where indicated at 1280 for electrically connecting the contact seats 1272 to conventional components for converting to electrical signals the circuit closings effected due to the tape manual markings applied to the channels 137A when the tape is passed through the reader. The inner contact 1272A has a lead 144A connecting same to ground or other equivalent common connection while the outer contact seat 1272A has a lead 144B connected to the circuit board synchronization sensing wiring.

The contact seats 1270, 1272, 1270A and 1272A and their electrical interconnections and leads may be formed on the circuit board by the practice of a suitable imprinting technique, such as silk screening, using suitable electrically conductive inks; plating techniques, using gold, silver, or the like, or etching techniques (where the board has copper foil or the like forming its side 1269) may also be employed. The wiring connections at the connection area 1280 may be of any suitable conventional wiring connector type, with the underside 1210 of the housing body 1208 being recessed as at 1284, and board 1212 being suitably perforated, to accommodate this.

The contact fingers 1244 and springs 1248 are formed from steel, having a Rockwell hardness in the range of from about 60 to about 65 to resist the abrasive action of the tape matte coating, and it is preferable that the heads of the contact assemblies engage the tape with a pressure of approximately one ounce per pin. Stainless steel 440, hardened to the Rockwell C range indicated, is the preferred material as it is resistant to rust or oxidation and is relatively inexpensive and readily hardened.

The circuit board 1212 is attached to the underside 1210 of the housing body 1208 by a centrally located attachment screw 1290 that passes through central opening 1292 of the circuit board into threaded engagement with the threaded opening 1294 on the underside of the housing body 1208. With the circuit board secured to the housing body 1208 in this manner and the circuit board 1212 oriented with respect to the housing body to align its contact seats with the respective housing body contact assembly receiving bores, the respective contact assemblies 1244 may be applied to the respective bores with the spherically contoured ends 1256 facing outwardly of the bores, as indicated in FIG. 15. The cover 1216 is then applied over and against the housing body upper side 1214 to hold the contact assemblies 1244 in place and define a slide way 1300 through the reader through which the tape 1200 is passed, and which is defined in the illustrated embodiment by the slot way 1222 and the planar underside 1302 of the cover 1216.

The cover 1216 comprises a generally planar cap member 1304 preferably formed from the same material as housing body 1208, and in the form shown, defines on either side of same an inner pair of attachment lugs 1310 each formed with threaded openings 1312 adapted to be aligned with screw receiving openings 1314 of the corresponding housing body lugs 1236 and the correspondingly located openings 1316 of the circuit board to receive the respective attachment screws 1318 that fix the cover 1216 against the top side 1214 of the housing body 1208 and also hold the reader components in operative alignment.

The cover 1216 is also formed to define the outer pairs of corner lugs 1320 formed with screw receiving openings 1321 that are to be aligned with the corresponding openings 1322 of the housing body lugs 1238, and the correspondingly located corner openings 1324 of the circuit board, for receiving suitable mounting screws 1325 for mounting the reader as a unit in operative position on suitable supporting structure.

Cover 1216 at the end 1330 thereof that is disposed adjacent the entrance end 1226 of the slot way 1222 is slotted or indented as at 1332 to define a working opening 1334 of generally U-shaped configuration which exposes a substantial portion of the entry end of the slot way 1222 for finger manipulation of the leading end of the tape 1200 into slideway 1300 as the tape leading end 1233 is initially being applied to the reader 1202.

The operator applies the leading end 1233 of a tape 1200 to the reader 1202 by inserting same within the entrance end 1226 of the slot way 1222 so that the tape leading end 1233 will underlie the cover web portions 1334 and 1336 that in part define the cover working opening 1334. The operator may then use one of his fingers or thumb to feed the leading end of the tape through the reader, by applying the digit involved with light pressure against the side of the tape facing the observer in FIGS. 14 and 15 (which is the back or unmarked side 1207 of the tape 1200), at the entrance end of the opening 1334, and then sliding the tape to the right of FIGS. 14 and 15, with this sliding operation being repeated as necessary until the leading end 1233 of the tape 1200 emerges from the exit end 1228 of the slot way 1222, where it may be grasped by the operator for pulling the entire tape through the reader manually.

Of course, the tape 1200 has now been applied to the reader with its surface 1205 that bears the electrically conductive imprinting that has been described facing the slot way base surface 1220 and the contact feeler assemblies 1244.

The underside 1210 of reader body 1208 and the top surfacing of cover 1216 may be appropriately recessed and reinforced to minimize the molding material needed to make this item while providing for adequate reinforcement. In the reader 1202, the body 1208 at the entrance end 1226 of slot way 1222 is extended outwardly of the slideway 1300, as at 1337, to extend the floor 1224 for facilitating the application of the tape leading end to the reader slideway 1300.

FIG. 19 illustrates more specifically the preferred form of tape, which in accordance with this invention, is applied to the reader 1202, it being understood that insofar as the reader 1202 is concerned (in the showing of FIG. 19), only the circuit board 1212 and contact seats and leads applied to same are shown in outline, and these are viewed from the underside 1267 of the circuit board. The leading end 1233 of the tape 1200, which is at the left hand side of FIG. 19, has been shown to be marked in the same manner as the leading end of the tape 120 which thus bears the I/O data bit manual markings of the first eight channels of work sheet 90 (together with the word end indicia for each of the computer words involved). Of course, the succeeding portions of the tape to the right of FIG. 19 will bear the corresponding manual markings for the succeeding groups of the work sheet channels 110.

The tape 1200 is to move through the reader 1202 in the relative direction indicated by the arrow 1340 of FIG. 19, relative to the contact seats and associated contact assemblies 1244 as applied to the circuit board 212 with the organization shown in FIG. 19.

As the tape 1200 moves through the reader and the manually made markings 134 and 136 pass by the respective contacts seats 1270 and 1272, and their associated contact assemblies 1244, feeler pins 1246 of paired assemblies 1244 are briefly placed in electrical connection through the respective marks 134 and 136 involved, as suggested in FIG. 18.

For instance, noting that contact seats 1270 and the inner contact seat 1270A are connected to ground or other common connection, assuming the mark 134 connects two of the guide dots 139A in the first channel of tape 1200 (which for convenience may be considered the uppermost channel 137A in the showing of FIG. 10), when the mark 134 in question is in contact with the feeler pin heads 1252 of the underlying feeler assemblies 1244 of the underlying assemblies 1244, this will briefly place these two feeler assemblies in electrical connection for supplying of an electrical pulse by way of lead 144. At the same time, two of the synchronization markings 130A will be in alignment with the feeler pin assemblies 1244 associated with the contact seats 1270A and 1272A.

Thus, assuming that the mark 134 in question is that immediately to the left of the circuit board 1212 as shown in FIG. 19, once such mark 134 engages the feeler pin assemblies 1244 having the two contact seats 1270 and 1272 aligned with same, the synchronization marks 130A of that tape column 124A are aligned with the feeler pin assemblies 1244 of the contact seats 1270A and 1272A, with the mark 130A on the left side of such column 124A briding the contact assemblies 1244 of the two contact seats 1272A, and the mark 130A on the right side of the column 124A in question bridging the contact assemblies 1244 of the contact seats 1270A, whereby the signal provided by the mark 134A is accompanied by a synchronizing signal for memory orientation purposes, as aforedescribed.

The spherical contour of the contact finger head portions 1258 enables the leading edge 1235 of the tape in being passed through the reader to cam the contact pins 1246 away from their position of engagement with the cover 1212 which they assume when the tape has been completely pulled through the reader. This disposes the contact pins 1246 in engagement with the side 1205 of the tape that bears the electrically conductive markings that have been described.

Figure 20:
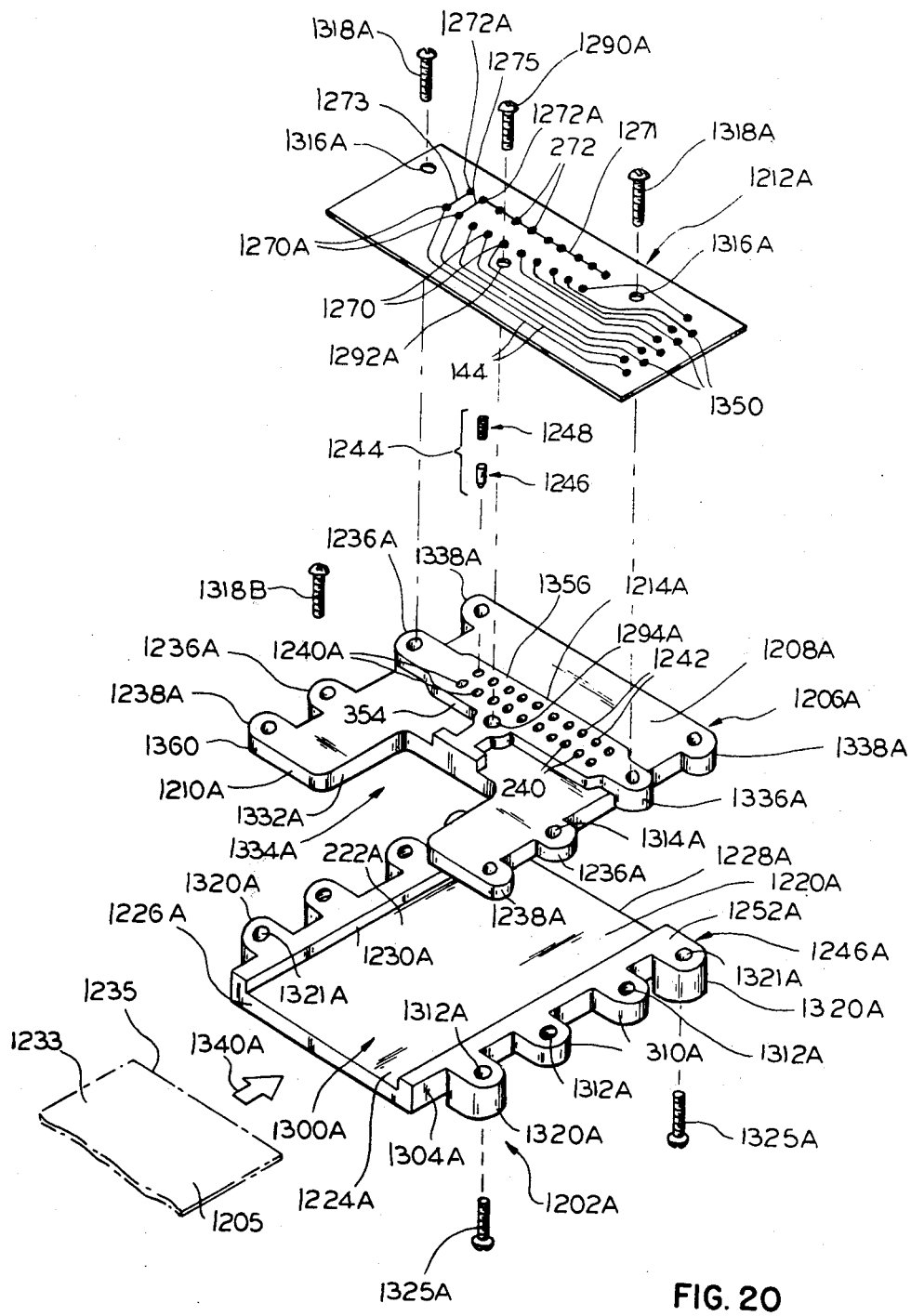
FIG. 20 is a view similar to that of FIG. 15 illustrating the reader in its preferred form, with the circuit board circuiting shown as viewed from the underside of the circuit board.

FIG. 20 illustrates a modified reader 1202A that functions in a manner that is similar to reader 202, but which involves improvements that make it the preferred reader arrangement for the practice of the invention.

Reader 1202A comprises housing 1206A that includes housing body 1208A having base cover 1216A applied to its underside 1210A and circuit board 1212A applied to the top or upper side 1214A.

In the reader 1202A, the housing 1206A and base cover 1216A are formed from the same material as the housing body 1208 and cover 1216 of reader 1202. Similarly, circuit board 1212A is generally similar to circuit board 1212, and includes the contacts 1270, 1272, 1270A, 1272A and associated connectors 1271, 1273, and 1275, and lead lines 144, 144A and 144B, except that it is the contacts 1272 that are electrically connected by connectors 1271, as indicated. Lead lines 144, 144A and 144B extend to the respective circuit board wiring openings 1350 for connection in the same manner as reader 1202.

The modified reader housing body 1208A is generally planar or flat in longitudinal configuration with its underside 1210A being planar for application thereto of cover 1216A. In this embodiment, it is the upper side 1252A of the cover 1216A that is recessed or slotted as at 1220A to define a slot way 1222A that is comparable to slotway 1222 of reader 1202; slotway 1222A similarly has planar floor 1224A that extends between the tape entering end 1226A of the slotway 1222A and it exit end 1228A. The slotway 1222A on either side of same is defined by upstanding opposed side walls 1230A that are spaced apart a distance which complements the transverse dimension of the tape 1200.

The housing body 1208A is formed on either side of same with a pair of inner lugs 1236A and a pair of end or outer lugs 1238A for reception of securement screws comparable in purpose of the corresponding screws 1318 and 1325 of reader 1202.

The housing body 1208A between two of the transversely aligned lugs 1236A, on either side of the housing body, is formed with ridge portion 1354 extending thereacross and defining a planar top surface 1356 that parallels the plane of body 1208A and forms its upper side 1214A. Along ridge portion 1354, body 1208A is formed to define the two rows of contact assembly receiving bores 1240 and 1242, of which a bore 1240 and a bore 1242 are aligned, as a pair longitudinally of the path of movement of the tape through the reader, and thus longitudinally of the longitudinal direction of the slotway 1222A. The bores 1240 and 1242 of body 208A each receive a contact assembly 1244 that is the same as the assemblies 1244 of reader 1202, and in the same manner.

The circuit board contact seats 1270, 1272, 1270A and 1272A and their electrical interconnections and leads of circuit board 1212A may be formed on the circuit board 1212A (and on the underside of same, as oriented in FIG. 20) in the same manner as described in connection with circuit board 1212. Note that board 1212A is marked for connecting wiring thereto in the same manner as board 1212.

The circuit board 1212A is attached to the housing body 1208A by the centrally located attachment screw 1290A that passes through central opening 1292A of the circuit board 212A into threaded engagement with the threaded opening 294A of the housing body 1208, and specifically, its ridge portion 1354. With the circuit board 1212A secured to the housing body 1208A in this manner, the resulting subassembly inverted from indicated positioning of FIG. 20, and the circuit board 1212A oriented with respect to the housing body 1208A to align its contact seats with the respective housing body contact assembly receiving bores, the respective contact assemblies 1244 may be applied to the respective bores of body 1208A, with the spherically contoured ends 1256 thereof facing outwardly of the bore. The bottom cover 1216A is then applied over and against the housing body lower side 1210A to hold the contact assemblies 1244 in place and define the slide way 1300A through the reader 1202A through which the tape 1200 is passed, and which is defined in the indicated embodiment by the slotway 1222A and the planar underside 1302A of the cover 1216A. This disposes the assemblies 1244 to have their ends 1256 facing slotway floor 1224A.

The cover 1216A comprises a generally planar cap member 1304A that in the form shown defines on either side of same an inner pair of attachment lugs 1310A each formed with threaded openings 1312A adapted to be aligned with screw receiving openings 1314A of the corresponding housing body lugs 1236A and a pair of correspondingly located openings 1316A of the circuit board 1212A (as indicated in FIG. 20) to receive the respective attachment screws 1318A that secure circuit board 1212A flush against top surface 1214A of body 1208A (with the circuit board contact seats aligned with the respective body bores 1240 and 1242), and that fix the cover 1216A against the under side 1210A of the housing body 1208A and also hold the reader components in operative alignment; a second set of screws 1318B secure the second set of body lugs 1236A to the second set of cover lugs 1310A.

The cover 1216A is also formed to define the outer pairs of corner lugs 1320A formed with screw receiving openings 1321A that are to be aligned with the corresponding openings 1322A of the housing body lugs 1238A, for receiving suitable mounting screws 1325A for mounting the reader 1202A as a unit in operative position on suitable supporting structure, and in the upright position indicated in FIG. 20, in which the contact pins 1246 project downwardly from the circuit board and are spring biased against slotway surface 1224A (as opposed to the showing of FIG. 18).

Housing body 1208A at the end 1360 thereof that is disposed adjacent the entrance end 1226A of the slotway 222A is slotted or indented as at 1332A to define the working opening 1334A that corresponds to working slot 1334 of reader 1202. This exposes a substantial portion of the entry end of the slotway 1222A for finger manipulation of the leading end of the tape 1200A into slideway 1300A as the tape leading end 1233 is initially being applied to the reader 1202A, as and in the manner described relative to reader 1202.

When the tape 1200 has been applied to the reader 1202A in the manner indicated, the tape surface 1205 that bears the electrically conductive imprinting that has been described faces the body undersurface 1210A and the contact feeler assemblies 1244.

The tape 1200 is moved through the reader 1202A in the same manner as it is applied to reader 1202, and in the relative direction indicated by the arrow 1340 of FIG. 20, relative to the contact seats and associated contact assemblies 1244 as applied to the circuit board 1212 with the organization indicated in FIG. 20.

As the tape 1200 moves through the reader 1202A and the manually made markings 134 and 136 pass by the respective contact seats 1270 and 1272, and their associated contact assemblies 1244, feeler pins 1246 of paired assemblies 1244 are briefly placed in electrical connection through the respective markings 134 and 136 involved, with the same results as described in connection with reader 1202.

Reader 1202A has the advantage that in its upright mounted position, the feeler assemblies 1244 extend downwardly toward cover 1216A. Thus, any dirt or other foreign matter getting into the area of assemblies 1244 will drop onto the tape and be removed from the reader on movement of the tape through the reader.

Figure 22:
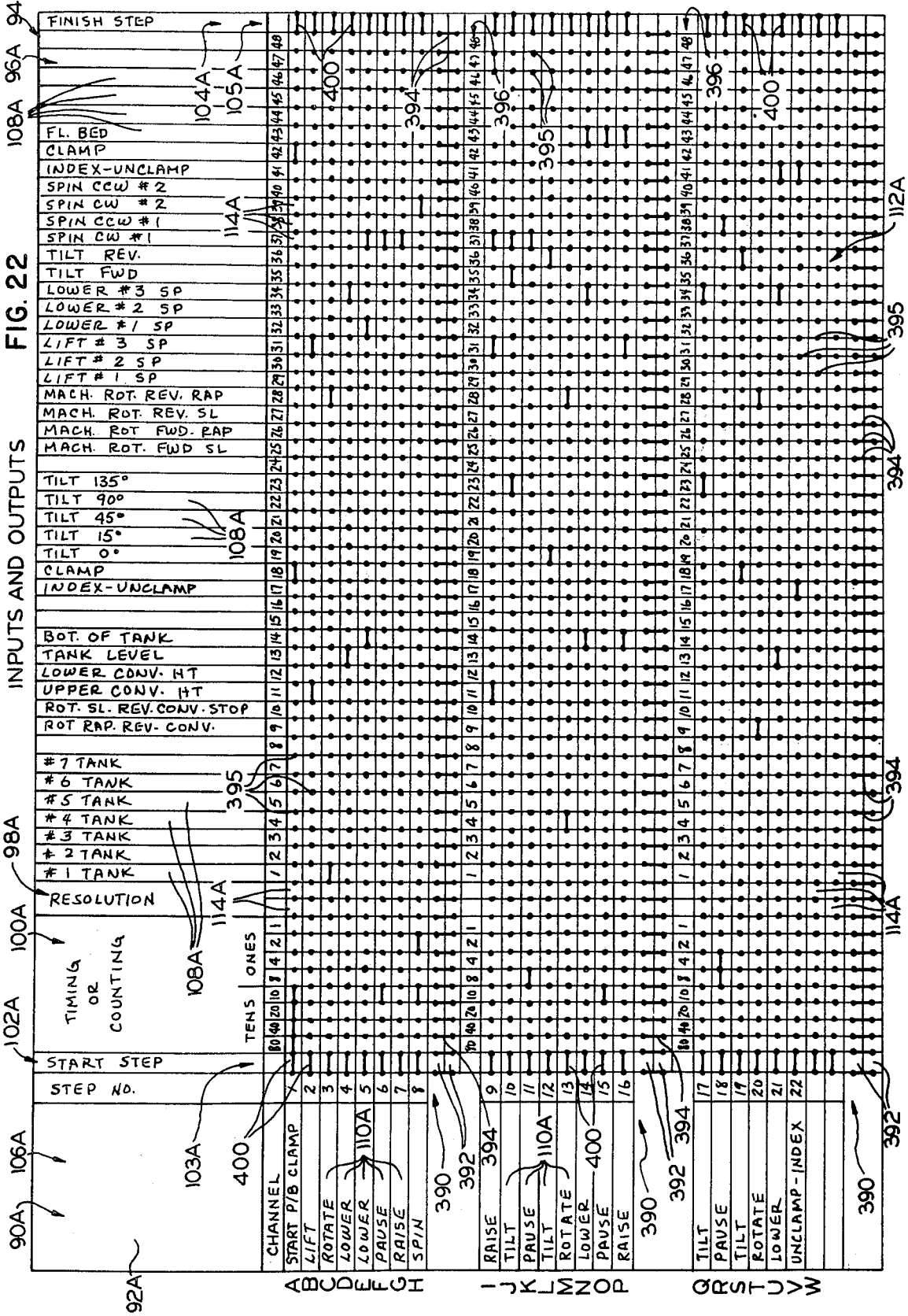
FIG. 22 illustrates an improved work sheet layout arranged for use with the tape of FIGS. 14–20.

FIG. 22 illustrates a preferred revised worked sheet 90A that is delineated for use with the preferred tape 1200. Work sheet 90A includes the basic components of work sheet 90 (as indicated by the corresponding reference numerals having the suffix "A"), but is organized to provide specific cooperation with the guide channels 137A, the columns 124A, the guide dots 139A, and the synchronization marks 130A of tape 1200.

The work sheet 90A comprises a suitable substrate 92A that is formed or delineated on one side or face of same to define across the top of same control zone 94A having input and output subzone 96A, resolution subzone 98A, and timing or counting subzone 100A. Zone 94A is interposed between the spaced apart vertically disposed tape locater columns or zones 102A and 104A.

Work sheet 90A defines or delineates step zone 106A and vertical columns 108A that are extended to the lower edge of the work sheet, and horizontal channels 110 which are extended across the work sheet to the right hand edge of same and in intersecting relation with the columns 108A.

The intersecting columns 108A and channels 110A lie in the work sheet computer word zone 112A wherein the intersecting columns 108A and channels 110A define the plurality of data bit receiving blanks 114A that are adapted to be manually marked in accordance with the practice of the invention.

Work sheet 90A includes the improvement of providing indicia in the computer work zone 112A that provides for facilitating the congruent lining up of the tape 1200 channels and columns 137A and 124A with the appropriate channels 110A and columns 108A, as well as locator columns 103A and 105A, of work sheet 90A.

Thus, an eight bit equipment is illustrated, work sheet computer word zone 112A has the channels 110A subdivided in channel groups 390 of eight such channels 110A each, with the eighth channel 110A of each group 390 having added below same, and above the channel group 390 following it, two supplemental channels 392 that have synchronization lines or markings 394 applied thereto that correspond to the location of tape synchronization markings 130A. The channels 392 are of the same general dimension as channels 110A and are intersected by columns 108A in the same manner as columns 107 intersect channels 110. In addition, the channels 110A and 392 have disposed along their midportions guide dots 395 that are located on the work sheet lines defining column 108A and that are located to correspond to the location of tape guide dots 139A, when the tape 200 is to be applied to work sheet 90A. Work sheet 90A between each channel group 390 includes a single channel 396 providing blanks for identification of the inputs and outputs for each group 390, as a matter of convenience.

In utilizing the work sheet 90A, the inputs and outputs involved in a particular program are listed across the input and output zone 96A in the same manner as suggested in FIG. 1, while the consecutive steps to be sequentially followed in operating the apparatus controlled by the program in question are listed in consecutive channels 110A within the step zone 106A, in the same manner as in work sheet 90 (keeping in mind that the added channels 392 and 396 intervene between adjacent channel groups 390).

The work sheet tape locater zones 102A and 104A have formed in same for each channel 110A the respective indicia 103 and 105A that are to indicate the ends of the respective computer words to be formed by using channels 110A and manually marking same, as will now be discussed.

With the work sheet 90A laid out in the manner indicated, and the operator, having in mind the steps to be performed in the process, the sequence of the steps, the inputs and outputs involved, and other control features that may be necessary or desirable, including the aforementioned resolution and timing or counting, can manually mark the work sheet 90A, in the area of the spaces 114A, to indicate, utilizing the binary notation system, when something is to happen. Assuming that spaces 114A left blank mean nothing is to happen, and the spaces 114A suitably marked indicate that some control action is to be taken, the engineer having determined what is to happen with reference to the various machinery components being controlled during the operation of the method, can mark the appropriate blank spaces 114A accordingly. In the arrangement of work sheet 90A, the guide dots 395 are employed for this purpose, instead of the letter "X" employed in sheet 90. This is done on the work sheet 90A by connecting the guide dots 395 that are disposed on either side of a data bit blank 114A that is to be so marked.

The work sheet 90A is made out to outline the same process as work sheet 90 (including its inputs and outputs, and process steps in the same order), and thus the same data bit blanks of sheet 90A are marked in this manner, as are shown marked in work sheet 90.

Additionally, the word end indicia 103A and 105A of the columns 102A and 104A are in the form of lines 400 connecting the guide dots 395 provided for this purpose.

In this connection, it is to be understood that the work sheet 90A in its printed or drawn format (as provided for use in practicing this invention) will include as preapplied indicia the guide dots 395, the synchronization lines 394, and the word end lines 400.

In accordance with the invention, the portions of the channels 110A extending between the tape locater zones 102A and 104A become computer data word areas or channels that are coextensive with the summation of the data bit blanks 114A lying in each of such channels 110A. With the channels 110A marked as indicated for a particular program, the data bit information of the respective channels 110A in summation thus comprises the computer data word for each step of the process being controlled.

Assuming the work sheet 90A is fully filled out as the invention contemplates for the particular process in question, and the data involved is to be applied to a tape 1200, the leading end 1233 of the tape is applied across the top eight channels 110A of the work sheet 90A (and thus the first channel group 390) to initiate application of the computer word data to the tape. This is done by aligning and centering the eight channels 137A of the tape 1200 with the top eight channels 110A of the work sheet 90A at the tape end in question, and aligning and centering the tape columns 124A with the columns 108A such alignment is facilitated in this embodiment of the invention by the technician placing the guide dots 139A of the tape 1200 in congruency with the guide dots 395 of the channel group in question (as viewed through the tape), as well as the tape synchronization markings 130A in similarly congruency with the work sheet lines 394. The technician then manually marks on the tape, in the data bit blank spaces 132A defined by the tape intersecting channels 137A and columns 124A, a marking 134 (in the electrically conductive penciling or the like), for each tape data bit space 132A involved, corresponding to the marked areas 114A of the work sheet channels 110A in question, by connecting the tape guide dots 139A. Thus, the tape data bit blank spaces 132A to be marked with the markings 134 will be in exact overlying relation to the marked areas 114A of the group of work sheet channels 110A in question. The same marking of the tape is also done as at 136 with reference to the word end indicia 103A and 105A that are applied to the respective work sheet zones 102A and 104A, to indicate on the tape the ends of the respective computer words for each step of the program that falls in the first group 390 of eight channels 110A in question.

It will be apparent that the elctrically conductive guide block and dots 139 and 139A of the tape as well as guide dots 395 of the work sheet in practice may be of any convenient shaping, though the round shape of tape 1200 and work sheet 90A is preferred; consequently, the term "guide dot" as used in the appended claims means markings of this type of both round and polygonal shapings. Also, the described congruency that the tape channels and columns are to have with the work sheet channels and columns, for applying of the program data bits to the tape, obviously need not be literal geometric congruency, as proper aligning and centering of the tape channels and columns with the work sheet channels and columns is adequate for the proper practice of the invention, even though the shapes and proportions involved may be varient or different.

Where the tape is partially delineated by printing that is non electrically conductive, for instance as employed in tape 120, such printing is preferably on the opposite side of the tape (for instance, side 1207 of tape 1200) that the electrically conductive printing and marking are to be applied to, or if on the same side, it is so located so as to be spaced from tape surface areas where the manually applied markings may be applied.

A characteristic feature of the invention is that as the tape for a particular program is pulled through the tape reader in accordance with the invention, the data bits of a predetermined number of computer words are simultaneously supplied to memory to be followed serially by the data bits of the next succeeding set of eight data words, etc. until the program has been entered into memory to provide the controller data base. The reader involved is of the continuous motion reading type, though where the process being programmed calls for a large number of steps, the tape 120 or 1200 bearing the computer word data therefor may be longer than the operator can physically pull through the reader in one stroke; thus, while the motion of the tape through the reader may stop at the point where the operator must change his grip on the tape to pull the following length or lengths of the tape through the reader, the basic tape and reader arrangement involved, in accordance with the invention, is of the continuous movement sensing type.

The tape employed for a particular program may be preserved to provide a record of what is entered in the controller memory. Where changes in the program are to be made, they are easily effected by changing the work sheet and then changing the tape accordingly, by repeating the matching of the tape columns to the work sheet columns that has been described, after which the tape is reapplied to the reader to insert the changed program into memory as the original program is erased. Alternately, the original tape can be preserved and a new tape prepared from the changed work sheet, or both the original tape and work sheet may be preserved and a new work sheet and tape prepared to effect the program changes.

In practicing the invention, should electrical failure occur resulting in shutting down of the controller, loss of the data in memory is an immaterial matter since the data needed can be immediately restored to memory by merely pulling the tape bearing the applicable program data through the reader when the power has been restored.

As indicated, a major advantage provided by the invention is that no special programming experience or qualifications are required for preparation of the work sheet and tape contemplated by the invention. The preparer of these materials should be, of course, sufficiently technically qualified with reference to the industrial process being controlled, to be familiar with the various components to be controlled and how they are to be controlled, so that the work sheet can be filled out from the input and output and related control aspects standpoint. Thus, the preparer of these materials may be the processing machinery operator who has had enough experience to run the processing apparatus involved, but who need not be educted either as an engineer or programmer.

In practicing the invention, in the preferred embodiment the tape has a thickness lying in the range of from about four mils to about five mils for adequate stiffness without undue thickness. The reader housing body and cover are to be shaped such that the tape receiving slideway is about twelve mils in depth, and the slotway side walls are spaced apart to slidingly guide a tape having a width of one and one half inches, which is the preferred size for tapes arranged in accordance with the invention, where eight bit processing units are involved.

It will be apparent that the principles of the invention may be applied to programming of a wide variety of industrial processes and the like. The specific mold forming process disclosure herein is provided for illustrative purposes only, primarily to better bring out the application of the principles of the invention to a practical situation.

While the readers herein disclosed are primarily intended for use in practicing the programmable control invention disclosed, the readers have separate utility as general purpose tape readers, as for instance, in connection with entering digital data into a computer.

Where the tapes employed are to have the aforedescribed matte antistatic coating, only the side of the tape that is to bear the computer word indicia involved should be so coated since the pressure of the reader feeler pins biasing the under side of the tape against the reader cover would result in undue abrasive action on the reader cover.

While the memory employed in practicing the invention preferably is of the RAM category, it may be of either the semi-conductor or core type. It is understood that the memory apparatus employed may be operated conventionally in modifying or replacing programs that have been entered into memory, in practicing the tape pull through techniques of this invention.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a programmable controller system for controlling an industrial process, with the system including a central processing unit including a binary notation system responsive instruction memory register, a tape reader for sensing binary notation system computer data bits on a programming tape when passed therethrough and connected to said unit for storing the data bits in said memory register, and means for operatively connecting I/O devices to said unit, the improvement comprising:

a work sheet for disposing the data bits for each step of the process in sequential computer data words, said work sheet comprising:

a substrate defining a working face delineated to define a series of vertical columns at like ends of which the process inputs and outputs may be separately assigned to the respective columns, and a series of horizontal channels formed for consecutively listing down the sheet the steps of the process in operational sequence, said columns and said channels intersecting across the sheet working face to form a computer data word zone comprising individual work sheet data bit receiving blank areas formed by said intersecting columns and channels for selectively receiving binary notation system type manual entry marks indicating I/O device functions for each step of said process in accordance with a predetermined program of operation for said process, said work sheet channels each having an equal number of said blank areas, said work sheet channels including means for defining computer data word end indicia at either end of same between which said blank areas are disposed to form in each said channel a continuous computer data word space of predetermined length, with said word end indicia at the respective ends of said channels being vertically aligned across the height of said work sheet and said work spaces being of equal lengths, whereby each computer word space of the work sheet may be selectively manually marked in said data bit receiving areas thereof, between said word end indicia thereof, binary notation system fashion to provide the computer data word for each step of said process, a tape for use in transferring said data words from said work sheet face to the reader, said tape comprising:

a ribbon formed from light previous material and delineated to define a group of channels extending longitudinally thereof for the tape length and shaped and spaced transversely thereof to be aligned congruently with a group of said work sheet channels consisting of a predetermined consecutive number of said work sheet channels, when said ribbon is disposed in juxtaposition with said work sheet face with said work sheet channels viewed through said ribbon, said ribbon being further delineated along its respective channels to define in said channels I/O device data bit receiving spaces consecutively corresponding to and formed to be congruent with said work sheet data bit blank areas when said ribbon channels are disposed in said congruency with said work sheet channels, means for manually marking said tape spaces, when said tape is sequentially placed in juxtaposed congruency with consecutive of said work sheet channel groups in overlying relation to the data word spaces thereof, corresponding to the location of the I/O device function marks and the data word end indicia of the respective data word spaces of the individual channels of the respective work sheet channel groups, for transferring onto said tape from said work sheet face said process step word data and said word end indicia thereof for each channel of consecutive of said work sheet channel groups, to form on said tape consecutive sets of said data words each set of which the data words of said process steps are consecutively and sequentially disposed transversely of said tape in their order of sequences in said operational sequence of said process, said reader including means for serially sensing said data word sets of said tape in consecutive sequence with continuous movement of one or more lengths of said tape through said reader, said register including means for storing in same, in said consecutive sequence, said word sets for controlling said process through said central processing unit.

2. The improvement set forth in claim 1 wherein:

said means for marking said tape spaces comprises means for making the tape markings electrically conductive for sensing by the reader.

3. The improvement set forth in claim 1 wherein:
said means for marking said tape comprises means for making said tape markings opaque for sensing by the reader.

4. The improvement set forth in claim 1 wherein:
said tape is perforated along said channels thereof at said spaces of said ribbon in equal spacing to be congruent with said work sheet blank areas of said work sheet channels when the ribbon is juxtaposed with said work sheet face with said tape spaces congruent with said work sheet spaces,
and said means for marking said tape comprises means for closing those of said tape perforations corresponding to the location of the work sheet I/O function markings and the work sheet channel word end indicia for the respective word sets, for sensing by the reader.

5. The improvement set forth in claim 1 wherein:
said ribbon defines longitudinally thereof equally spaced apart synchronization means, to which said reader is responsive, adjacent one edge of same for coordinating the process step data words transferred to said tape with said sending means of said reader.

6. The method of programming a programmable controller system for controlling an industrial process, in which the system includes a central processing unit including a binary notation system responsive instruction memory register, a tape reader for sensing binary notation system computer data bits on a programming tape when passed therethrough and connected to said unit for storing the data bits in the memory register, and means for operatively connecting I/O devices to said unit,
said method comprising:
forming a work sheet delineated to define on its working face a series of vertical columns to which the process inputs and outputs are respectively assigned and a series of horizontal channels consecutively listing the steps of the process in operational sequence, with said columns and said channels intersecting to form individual work sheet data bit receiving blank areas for selectively receiving manual entry marks binary notation system fashion indicating I/O device functions for each step of said process in accordance with a predetermined program of operation for said process, and with said channels each having computer data word end indicia at either end of same between which said blank areas are disposed to form for each channel a computer data word space of the same predetermined length,
manually marking said work sheet word spaces binary notation system fashion to indicate I/O device functions for each step in the process in accordance with the predetermined program of operation for said process to provide the computer data word for each step of said process,
taking a tape formed from light pervious material and having a width proportioned to overlie a group of the work sheet channels comprising a predetermined number of consecutively adjacent of said work sheet channels, with the tape being delineated to define a group of channels extending longitudinally thereof for the tape length and shaped and spaced transversely thereof for congruent aligning with the channels of the group of work sheet channels, and manually marking the tape binary notation fashion, starting with the leading end of same, when the tape is sequentially placed against the work sheet face with the tape channel group in congruency with sequentially consecutive of said work sheet channel groups as viewed through the tape, corresponding to the location of the I/O device function marks and the word end indicia of the respective work sheet channel data word spaces of the respective work sheet channel groups, whereby the computer data word including its end indicia, for each said step making up the predetermined process operation program, is transferred to the tape in said channel group form in the sequential order of such steps as they occur in said program of operation of said process, with such process step data words of consecutively succeeding channel groups following serially on the tape,
and passing the tape, with continuous movement of successive lengths thereof, and beginning with the leading end thereof, through the reader, and sequentially storing in the memory register the process step data words and ends thereof, of said tape consecutive channel groups, for controlling said process through said control processing unit.

7. The method set forth in claim 6 wherein:
the tape is passed through the reader by being manually drawn through same.

8. The method set forth in claim 6 wherein:
the manual markings on the tape are removable.

9. The method set forth in claim 8 wherein:
the program is amended by revising the manually applied tape markings to reflect changes in the I/O device function,
and then the tape is repassed through the reader to replace, in the memory register, the original program process step data word of said channel groups with the amended program process step data words and the ends of same, of said tape consecutive groups.

10. The method set forth in claim 6 including:
preserving the tape as a permanent record of the process step data words stored in the memory register.

* * * * *